US012739130B2

(12) United States Patent
Hoermann et al.

(10) Patent No.: US 12,739,130 B2
(45) Date of Patent: Sep. 15, 2026

(54) EXTRACTION OF DATA IN A MUTUALLY DISTRUSTFUL ENVIRONMENT

(71) Applicant: Oracle International Corporation, Redwood Shores, CA (US)

(72) Inventors: Christian Rudolf Hoermann, Raleigh, NC (US); Dharma Ganesan, Columbia, MD (US); Thomas William Keetch, Blackburn with Darwen (GB); David Meibusch, Brisbane City (AU)

(73) Assignee: Oracle International Corporation, Redwood Shores (CA)

( * ) Notice: Subject to any disclaimer, the term of this patent is extended or adjusted under 35 U.S.C. 154(b) by 115 days.

(21) Appl. No.: 18/828,916

(22) Filed: Sep. 9, 2024

(65) Prior Publication Data

US 2025/0384165 A1 Dec. 18, 2025

Related U.S. Application Data

(60) Provisional application No. 63/659,243, filed on Jun. 12, 2024, provisional application No. 63/659,241, filed on Jun. 12, 2024.

(51) Int. Cl.
*H04L 9/32* (2006.01)
*G06F 21/62* (2013.01)
(Continued)

(52) U.S. Cl.
CPC ........ *H04L 9/3247* (2013.01); *G06F 21/6227* (2013.01); *G06F 21/64* (2013.01); *H04L 63/0428* (2013.01)

(58) Field of Classification Search
CPC ............... H04L 9/3247; H04L 63/0428; G06F 21/6227; G06F 21/64; G06F 21/0428
See application file for complete search history.

(56) References Cited

U.S. PATENT DOCUMENTS 8,639,989 B1 * 1/2014 Sorenson, III ...... G06F 11/2071 709/224
9,710,617 B2 7/2017 Oxford
(Continued)

FOREIGN PATENT DOCUMENTS

CN 105227565 A * 1/2016 ......... H04L 63/0884
CN 114721634 A * 7/2022 ......... G06F 21/6227
(Continued)

OTHER PUBLICATIONS

Zhao. English translation of CN 115225399 A. (Year: 2022).*
(Continued)

*Primary Examiner* — Sarah Su
(74) *Attorney, Agent, or Firm* — Mughal Gaudry & Franklin PC

(57) ABSTRACT

Techniques for transmitting data within a cloud environment are disclosed. Data is received by a transmission service, which transmits the data to a signature and encryption (SE) service, along with an encryption key. Signed and encrypted data, which is received from the SE service, is (i) encrypted using the encryption key and (ii) signed by the SE service. In an example, the SE service maintains a log of the data. The signed and encrypted data is transmitted to an intermediate zone, to facilitate the intermediate zone to verify a signature of the signed and encrypted data, and allow passage of the signed and encrypted data to a reception service. The transmission and reception services are within a first tenancy and a second tenancy, respectively, of a cloud environment; and the intermediate zone is within one of the first tenancy or a third tenancy of the cloud environment.

23 Claims, 18 Drawing Sheets

(51) Int. Cl.
*G06F 21/64* (2013.01)
*H04L 9/40* (2022.01)

(56) References Cited

U.S. PATENT DOCUMENTS

| | | | | |
|---|---|---|---|---|
| 10,341,321 | B2 | 7/2019 | Kumar et al. | |
| 10,981,306 | B1 | 4/2021 | Weinstein et al. | |
| 11,153,283 | B2 | 10/2021 | Graber et al. | |
| 11,165,592 | B2 | 11/2021 | Barreto | |
| 11,251,959 | B2 | 2/2022 | Wentz | |
| 11,488,147 | B2 | 11/2022 | Sheng et al. | |
| 11,531,783 | B2 * | 12/2022 | Hamel | H04L 63/102 |
| 11,784,985 | B2 | 10/2023 | Graber et al. | |
| 12,341,902 | B2 | 6/2025 | Kim et al. | |
| 12,348,649 | B1 * | 7/2025 | Kaplan | H04L 9/3247 |
| 12,425,203 | B2 | 9/2025 | Chang et al. | |
| 12,609,836 | B2 * | 4/2026 | Hoermann | H04L 9/3247 |
| 2019/0199692 | A1 | 6/2019 | Atta et al. | |
| 2020/0412548 | A1 * | 12/2020 | Allen | G06F 8/658 |
| 2023/0246845 | A1 * | 8/2023 | Peddada | G06F 21/602<br>713/176 |

FOREIGN PATENT DOCUMENTS

| | | | | |
|---|---|---|---|---|
| CN | 115225399 | A * | 10/2022 | H04L 9/3247 |
| CN | 120034336 | A * | 5/2025 | H04L 67/12 |
| CN | 121169539 | A * | 12/2025 | |
| GB | 2604337 | A * | 9/2022 | H04L 9/3247 |
| JP | 2023137873 | A * | 9/2023 | H04L 9/0894 |
| WO | WO-2025259537 | A1 * | 12/2025 | H04L 9/3247 |
| WO | WO-2025259538 | A1 * | 12/2025 | H04L 9/3247 |

OTHER PUBLICATIONS

Cai et al., "LightSCA: Lightweight Side-Channel Attack via Discrete Cosine Transform and Residual Networks," 2022 IEEE 24th Int Conf on High Performance Computing & Communications; 8th Int Conf on Data Science & Systems; 20th Int Conf on Smart City; 8th Int Conf on Dependability in Sensor, Cloud & Big Data Systems & Application (HPCC/DSS/SmartCity/DependSys), Hainan, China, 2022, pp. 793-800, doi 10.1109/HPCC-DSS-SmartCity-DependSys57074.2022.00131 (8 pages).

International Search Report & Written Opinion notified Oct. 13, 2025 for PCT Patent Application No. PCT/US2025/032519.

International Search Report & Written Opinion notified Sep. 1, 2025 for PCT Patent Application No. PCT/US2025/032521.

Non-Final Office Action for U.S. Appl. No. 18/828,919 notified Nov. 24, 2025.

Notice of Allowance for U.S. Appl. No. 18/828,919 notified Mar. 6, 2026.

* cited by examiner

500

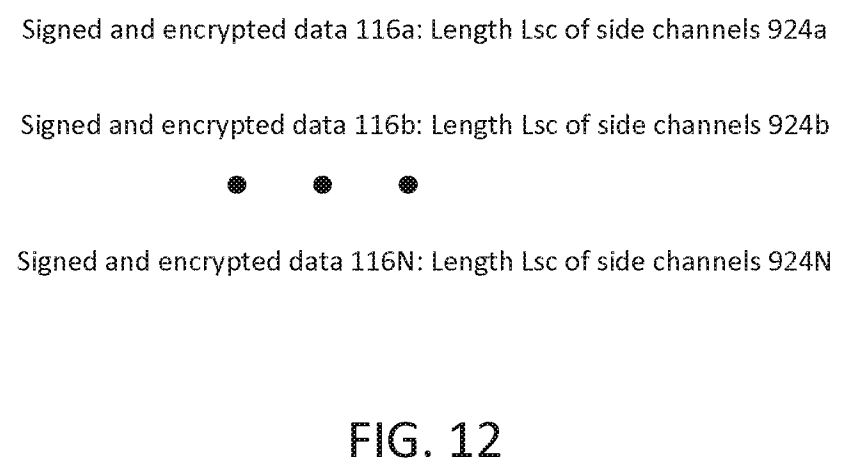

Signed and encrypted data 116a: Length Lsc of side channels 924a

Signed and encrypted data 116b: Length Lsc of side channels 924b

● ● ●

Signed and encrypted data 116N: Length Lsc of side channels 924N

FIG. 12

EXTRACTION OF DATA IN A MUTUALLY DISTRUSTFUL ENVIRONMENT

CROSS REFERENCE TO RELATED APPLICATIONS

The present application claims priority from U.S. provisional patent application Ser. No. 63/659,241, entitled "EXFILTRATION OF DATA IN A MUTUALLY DISTRUSTFUL ENVIRONMENT," filed Jun. 12, 2024, also claims priority from U.S. provisional patent application Ser. No. 63/659,243, entitled "PREVENTION OF INFORMATION LEAKAGE THROUGH SIGNATURE," filed Jun. 12, 2024, and is related to U.S. patent application Ser. No. 18/828,919, entitled "PREVENTION OF INFORMATION LEAKAGE THROUGH SIGNATURE," filed on even date herewith, which are hereby incorporated by reference in their entirety for all purposes.

BACKGROUND

A cloud provider provides on-demand, scalable computing resources (e.g., a cloud environment) to its cloud customers. A cloud customer generally desires to run its cloud resources without monitoring, scanning, or other interference by the cloud provider or other cloud customer. Therefore, the cloud provider offers "tenancies" to its cloud customers. A tenancy is an isolated partition within the cloud environment, such that resources in different tenancies are isolated from each other unless explicitly shared. Each tenancy runs a plurality of virtual machine compute instances.

BRIEF SUMMARY

In some embodiments, a computer-implemented method includes receiving, by a transmission service, data; transmitting the data to a signature and encryption (SE) service, along with an encryption key; receiving, from the SE service, (i) signed and encrypted data that is encrypted using the encryption key and signed by the SE service, and (ii) metadata including an indication of an amount of a source code included within the data; and transmitting the signed and encrypted data and the metadata to an intermediate zone, to facilitate the intermediate zone to verify a signature of the signed and encrypted data, and allow passage of the signed and encrypted data to a reception service. In an example, the transmission service is within a first tenancy of a cloud environment; and the reception service is within a second tenancy of the cloud environment that is different from the first tenancy. In an example, the intermediate zone is within one of (i) the first tenancy of the cloud environment, or (ii) a third tenancy of the cloud environment that is different from each of the first and second tenancies. In an example, the method further includes subsequent to receiving the data, generating a cleartext form of the data, wherein transmitting the data to the SE service comprises transmitting the cleartext form of the data to the SE service. In an example, the method further includes responsive at least in part to the intermediate zone verifying the signature of the signed and encrypted data, receiving, from the intermediate zone, the signed and encrypted data at the reception service. In an example, the method further includes providing one or more keys to the reception service for decryption of the signed and encrypted data; and refraining from providing the one or more keys to the intermediate zone for decryption of the signed and encrypted data, wherein the transmission service does not have access to a signature key used by the SE service to sign the encrypted data.

In an example, the metadata indicates whether the amount of the source code included within the data is less than, or greater than a threshold value. In an example, the encryption key is a first encryption key; at least a section of the metadata is encrypted using a second encryption key that is different from the first encryption key; and the intermediate zone decrypts at least the section of the metadata, without decrypting the signed and encrypted data. In an example, at least the section of the metadata that is encrypted is less than one byte. In an example, the source code is of a program that is deployable to a plurality of mobile devices or to a cloud-based server; and the metadata quantifies the amount of the source code included within the data. In an example, the intermediate zone allows passage of the signed and encrypted data to the reception service, responsive at least in part to the amount of the source code included within the data, as indicated by the metadata, being less than a threshold value. In an example, the SE service maintains a log of the data, and the log of the data includes the source code included within the data.

In an example, the method further includes analyzing a source code of a program that is deployable to a plurality of mobile devices; generating the data that includes results of analyzing the source code; and transmitting the data to the transmission service. In an example, the data is first data, wherein the encryption key is a first encryption key, wherein the signed and encrypted data is first signed and encrypted data, and wherein the method further comprises: transmitting, by the transmission service, second data to the SE service, along with a second encryption key; receiving, from the SE service, second signed and encrypted data that is (i) encrypted using the second encryption key and (ii) signed by the SE service; detecting an error condition associated with the second signed and encrypted data; transmitting, by the transmission service, a request to the intermediate zone; receiving, by the transmission service, a debug token from the intermediate zone, responsive at least in part to transmitting the request to the intermediate zone; transmitting, by the transmission service, the debug token to the SE service; and receiving debug information from the SE service, responsive at least in part to transmitting the debug token to the SE service, the debug information including information associated with debugging the error condition. In an example, the method further includes transmitting, by the transmission service, the debug information to the intermediate zone for debugging. In an example, the method further includes transmitting, by the transmission service, the data and the second encryption key to the SE service, along with transmitting the token to the SE service; receiving, from the SE service, third signed and encrypted data, along with receiving the debug information from the SE service; and transmitting, by the transmission service, the debug information and the third signed and encrypted data to the intermediate zone for debugging. In an example, the method further includes transmitting, by the transmission service, the second signed and encrypted data to the intermediate zone, along with transmitting the request to the intermediate zone.

In some embodiments, a non-transitory computer-readable medium includes instructions that when executed by one or more processors, cause the one or more processors to perform operations including transmitting, by a transmission service, data to a signature and encryption (SE) service, along with an encryption key; receiving, from the SE service, signed and encrypted data that is (i) encrypted using the encryption key and (ii) signed by the SE service; detecting an error condition associated with the signed and encrypted data; transmitting, by the transmission service, a request to an intermediate zone; receiving, by the transmission service, a debug token from the intermediate zone, responsive at least in part to transmitting the request to the intermediate zone; transmitting, by the transmission service, the debug token to the SE service; receiving debug information from the SE service, responsive at least in part to transmitting the debug token to the SE service, the debug information including information associated with debugging the error condition; and transmitting, by the transmission service, the debug information to the intermediate zone, for debugging the error condition. In an example, the transmission service is within a first tenancy of a cloud environment; and the intermediate zone is within a second tenancy of the cloud environment that is different from the first tenancy. In an example, the signed and encrypted data is first signed and encrypted data, and wherein the operations further include: transmitting, by the transmission service, the data and the encryption key to the SE service, along with transmitting the token to the SE service; receiving, from the SE service, second signed and encrypted data, along with receiving the debug information from the SE service; and transmitting, by the transmission service, the second signed and encrypted data to the intermediate zone, along with transmitting the debug information to the intermediate zone. In an example, the operations further include transmitting, by the transmission service, the data to the intermediate zone, along with transmitting the second signed and encrypted data and the debug information to the intermediate zone.

In some embodiments, a system comprises one or more processors; and one or more non-transitory computer-readable media storing instructions, which, when executed by the system, cause the system to perform a set of actions including: receiving, by a transmission service, data; transmitting the data to a signature and encryption (SE) service, along with an encryption key; receiving, from the SE service, signed and encrypted data that is (i) encrypted using the encryption key and (ii) signed by the SE service, wherein the SE service maintains a log of the data; and transmitting the signed and encrypted data to an intermediate zone, to facilitate the intermediate zone to verify a signature of the signed and encrypted data, and allow passage of the signed and encrypted data to a reception service. In an example, the transmission service is within a first tenancy of a cloud environment; the reception service is within a second tenancy of the cloud environment that is different from the first tenancy; and the intermediate zone is within one of (i) the first tenancy of the cloud environment, or (ii) a third tenancy of the cloud environment that is different from each of the first and second tenancies.

In some embodiments, a computer implemented method comprises receiving, by a transmission service, data; transmitting the data to a signature and encryption (SE) service, along with an encryption key; receiving, from the SE service, signed and encrypted data that is (i) encrypted using the encryption key and (ii) signed by the SE service; verifying that sensitive information is not leaked through a side channel of a signature of the signed and encrypted data; and responsive to verifying that the sensitive information is not leaked through the side channel of the signature of the signed and encrypted data, transmitting the signed and encrypted data. In an example, verifying that the sensitive information is not leaked through the side channel of the signature comprises: determining a length of the side channel of the signature of the signed and encrypted data; verifying that the length of the side channel of the signature does not exceed a threshold length; and responsive to verifying that the length of the side channel of the signature does not exceed the threshold length, verifying that the sensitive information is not leaked through the side channel of the signature. In an example, the threshold length is less than a length of the sensitive information. In an example, the sensitive information comprises the encryption key.

In an example, the side channel of the signature supposedly includes random numbers, and verifying that sensitive information is not leaked through the side channel comprises verifying that the sensitive information is not posed as the random numbers of the side channel and leaked through the side channel. In an example, a first encryption and signature operation and a second encryption and signature operation are two consecutive encryption and signature operations performed by the SE service; and the SE service is ephemeral in nature, such that a state of the SE service from the first encryption and signature operation is not maintained during the second encryption and signature operation. In an example, the method further comprises verifying that the SE service is ephemeral in nature. In an example, the SE service maintains a log of the data. In an example, transmitting the signed and encrypted data comprises transmitting the signed and encrypted data to an intermediate zone, to facilitate the intermediate zone to verify a signature of the signed and encrypted data, and allow passage of the signed and encrypted data to a reception service. In an example, the transmission service and the SE service are within a first tenancy of a cloud environment; and the reception service is within a second tenancy of the cloud environment that is different from the first tenancy. In an example, the intermediate zone is within one of (i) the first tenancy of the cloud environment, or (ii) a third tenancy of the cloud environment that is different from each of the first and second tenancies. In an example, the method further comprises responsive at least in part to the intermediate zone verifying the signature of the signed and encrypted data, receiving, from the intermediate zone, the signed and encrypted data at the reception service.

In an example, the method further comprises subsequent to receiving the data, generating a cleartext form of the data, wherein transmitting the data to the SE service comprises transmitting the cleartext form of the data to the SE service. In an example, the data includes a subset of a source code of a program that is deployable to a plurality of mobile devices. In an example, the SE service maintains a log of the data, and the log of the data includes the subset of the source code.

In some embodiments, a non-transitory computer-readable medium includes instructions that when executed by one or more processors, cause the one or more processors to perform operations including receiving, by a transmission service, data; transmitting the data to a signature and encryption (SE) service, along with an encryption key; receiving, from the SE service, signed and encrypted data that is (i) encrypted using the encryption key and (ii) signed by the SE service; verifying that sensitive information is not leaked through a side channel of a signature of the signed and encrypted data; and responsive to verifying that the sensitive information is not leaked through the side channel of the signature of the signed and encrypted data, transmitting the signed and encrypted data. In an example, verifying that the sensitive information is not leaked through the side channel of the signature comprises determining a length of the side channel of the signature of the signed and encrypted data;

and responsive to the length of the side channel of the signature not exceeding a threshold length, verifying that the sensitive information is not leaked through the side channel of the signature. In an example, the threshold length is less than a length of the sensitive information, and wherein the sensitive information comprises the encryption key.

In some embodiments, a system comprises one or more processors; and one or more non-transitory computer-readable media storing instructions, which, when executed by the system, cause the system to perform a set of actions including receiving, by a transmission service, data; transmitting the data to a signature and encryption (SE) service, along with an encryption key; receiving, from the SE service, signed and encrypted data that is (i) encrypted using the encryption key and (ii) signed by the SE service; verifying that sensitive information is not leaked through a side channel of a signature of the signed and encrypted data; and responsive to verifying that the sensitive information is not leaked through the side channel of the signature of the signed and encrypted data, transmitting the signed and encrypted data. In an example, verifying that the sensitive information is not leaked through the side channel of the signature comprises determining a length of the side channel of the signature of the signed and encrypted data; and responsive to the length of the side channel of the signature not exceeding a threshold length, verifying that the sensitive information is not leaked through the side channel of the signature, wherein the threshold length is less than a length of the sensitive information, and wherein the sensitive information comprises the encryption key.

In some embodiments, a system is provided that includes one or more data processors and a non-transitory computer-readable storage medium containing instructions which, when executed on the one or more data processors, cause the one or more data processors to perform part or all of one or more methods disclosed herein.

In other embodiments, a computer-program product is provided that is tangibly embodied in a non-transitory machine-readable storage medium and that includes instructions configured to cause one or more data processors to perform part or all of one or more methods disclosed herein.

Cloud services, microservices, or other machine-hosted services may be offered that perform part or all of one or more methods disclosed herein. The machine-hosted services may be provided by a single machine, by a cluster of machines, or otherwise distributed across machines. The one or more machines may be configured to send and receive data, which may include instructions for performing the methods or results of performing the methods, via an application programming interface (API) or any other communication protocol.

In various embodiments, part or all of one or more methods disclosed herein may be performed by stored instructions such as a software application, computer program, or other software package installed in memory or other storage of a computing platform, such as an operating system, which provides access to physical or virtual computing resources. The operating system may provide access to physical or virtual resources of a mobile computing device, a laptop computing device, a desktop computing device, a server computing device, a container in a virtual machine on a computing device, or any other computing environment configured to execute stored instructions.

As used herein, the terms "first," "second," "third," "fourth," etc. are used as naming conventions to refer to separate items in a set of items. These naming conventions do not imply ordering unless such ordering is explicitly noted using language specific to ordering, such as "before" or "after," or unless such ordering is required to attain the expressly recited functionality, such as generating an item and later accessing the generated item.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

FIG. 12 illustrates a stream of signed and encrypted data transmitted by a transmission service to a reception service through an intermediate zone.

DETAILED DESCRIPTION

Figure 1:
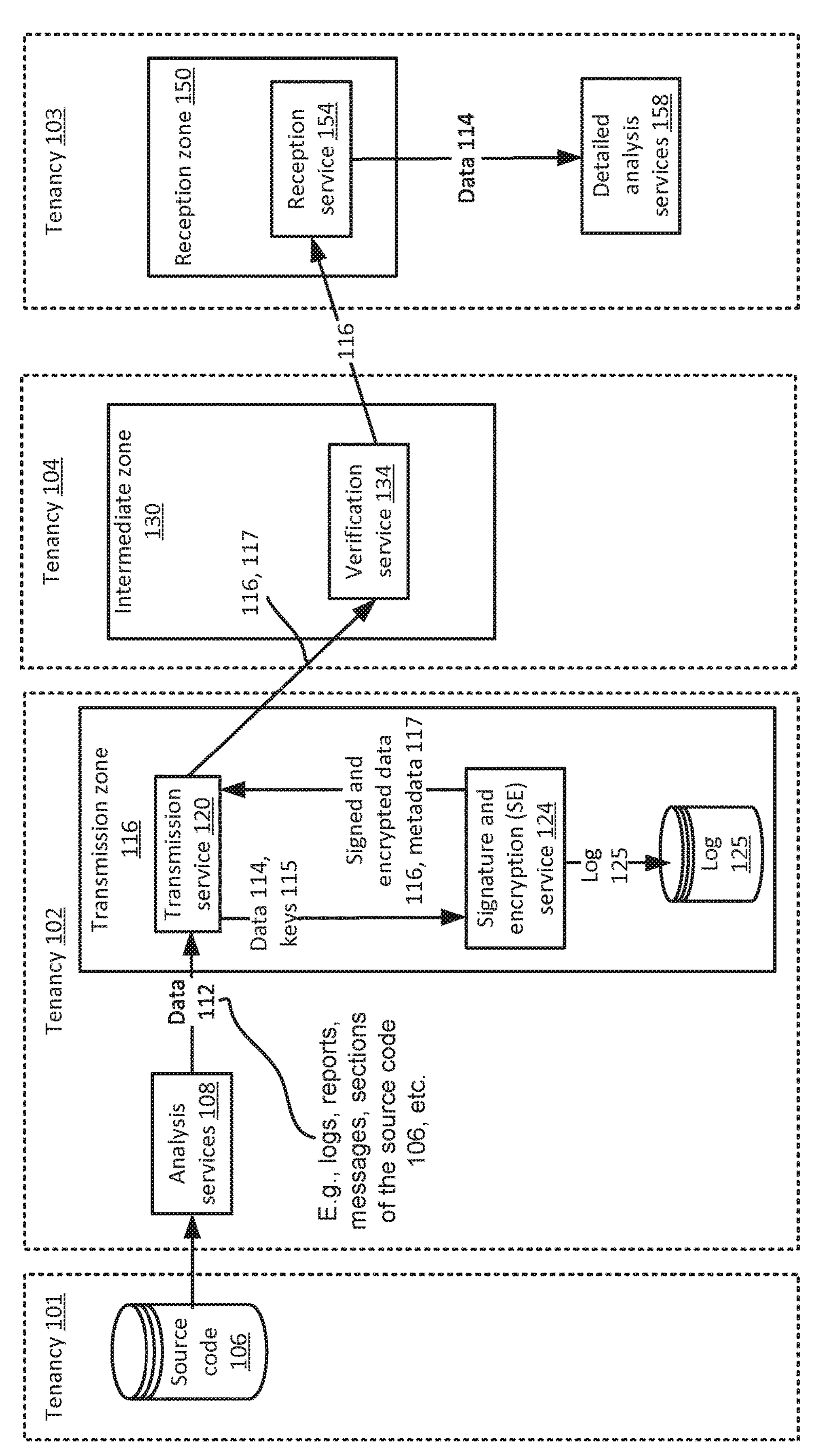
FIG. 1 illustrates a block diagram of a cloud environment comprising (i) a first tenancy including a transmission zone, and (ii) a second tenancy including a reception zone, wherein signed and encrypted data is transmitted from the transmission zone of the first tenancy to the reception zone of the second tenancy, via an intermediate zone that verifies a signature of the signed and encrypted data.

Maintaining security of a cloud environment involves controlling access to cloud resources based on permissions specified by respective cloud customers. A cloud customer can grant permissions for accessing cloud resources that it rents, but the cloud customer should not be able to grant permissions for accessing cloud resources rented by other customers. A tenancy is a conceptual bucket that holds cloud resources belonging to a particular cloud customer. An administrator of a tenancy has administrative rights to set access policies for cloud resources in the tenancy; an administrator of a tenancy does not have administrative rights to set access policies for cloud resources in another tenancy. A tenancy of a cloud customer is isolated from another tenancy of another cloud customer. A tenancy of a cloud customer includes a plurality of active cloud resources, such as compute instances that are used to host virtual machines. The cloud provider may also have control on one or more tenancies (e.g., cloud provider tenancies), through which the cloud provider may provide one or more services to the cloud customers.

In an example, a tenancy rented to a cloud customer (also referred to herein as a "cloud customer tenancy") includes one or more repositories for storing source code of one or more programs. For example, the source code may be of a program that is deployable within a plurality of mobile devices. In one example, the source code may be processed through a build pipeline to generate software packages including binary version of the source code. The software packages including binary version of the source code may then be deployed to a plurality of mobile devices. In another example, the source code represents the software packages including binary version of code that are deployable to a plurality of mobile devices. The scope of this disclosure is not limited to any particular type of source code.

In a typical scenario, a cloud customer renting a tenancy may develop source codes, test, build, and package the source codes, and deploy the source codes to a plurality of mobile devices, without significant intervention, monitoring, and/or control from a provider of the cloud environment or from another third party. However, in the cloud environment described herein, in the context of software assurance, an additional role of an assurance administrator is added into the picture. The assurance administrator may or may not be the same as the cloud provider. In an example, the assurance administrator acts as a "trusted technology provider" (TTP). It is assumed herein that the assurance administrator is the same as the cloud provider (the provider or owner of the cloud environment), although the teachings of this disclosure are not limited by such assumptions, and the assurance administrator may be different from the cloud provider.

With regard to the subject disclosure, in an example, the assurance administrator has a monitoring role over a manner in which the cloud customer is using the cloud resources. Merely as an example, the assurance administrator may want to monitor the source code, to ensure that the cloud customer is compliant with guidelines mutually agreed between the cloud customer and the assurance administrator. In an example, the assurance administrator may be tasked by a government regulatory agency to monitor the source code, e.g., to ensure that the source code adheres to regulatory guidelines established by the government regulatory agency. As a part of such software assurance, the assurance administrator may want to review and analyze the source code, and/or review and analyze various logs, messages, reports, etc. generated within the cloud customer tenancy. Detected anomalies or issues may be reported back to the assurance administrator. The assurance administrator processes such anomalies or issues, and may negotiate with the cloud customer to fix the detected anomalies or issues. In an example, if the anomalies or issues indicate significant security risks, the assurance administrator may escalate the anomalies or issues, and in extreme cases, may even report the anomalies or issues to a higher reporting authority (such as a government regulatory agency). Software assurance actions taken by the assurance administrator may be implementation specific, and may vary from one implementation to the next.

In any case, the assurance administrator provides and operates analysis services configured to analyze the source code and/or various logs, messages, reports, etc. within the cloud customer tenancy, and to generate analysis data based on such analysis. Examples of various types of analysis, and/or resultant analysis data are described below in detail. Such analysis may be performed within the cloud customer tenancy, or within a tenancy separate from the cloud customer tenancy.

In an example, the assurance administrator may want to extract the analysis data from the analysis service to a reception zone within an "assurance administrator tenancy." In an example, further analysis of the analysis data may be performed within the assurance administrator tenancy.

In an example, one or more personnel engaged by the assurance administrator may operate the analysis services, and facilitate in gathering the analysis data. In an example, the assurance administrator may not immediately want to share with the cloud customer the actual analysis data being extracted from the cloud customer tenancy to the assurance administrator tenancy, and may want to maintain "confidentiality of analysis" of the analysis data for at least a short period of time. Note that the assurance administrator may eventually share the extracted analysis data at a later stage with the cloud customer (e.g., after the assurance administrator has reviewed and further analyzed the analysis data more thoroughly at the assurance administrator tenancy). Due to the confidentiality of analysis objective of the analysis data, the assurance administrator may not want the cloud customer to know contents of the analysis data being extracted to the assurance administrator tenancy.

However, the cloud customer may want to have control over the analysis data extracted from the cloud customer tenancy to the assurance administrator tenancy. For example, the source code is developed by the cloud customer, and is the intellectual property of the cloud customer. Accordingly, the cloud customer may prefer to maintain confidentiality of the source code. For example, the cloud customer may want to at least have a list or log of the analysis data to be extracted from the cloud customer tenancy to the assurance administrator tenancy. This is referred to as the cloud customer's desire to maintain "confidentiality of the source code."

Accordingly, there is a level of mutual distrust between the assurance administrator and the cloud customer, and there are conflicting objectives between the goals of the cloud customer and the assurance administrator. For example, (i) the assurance administrator desires to extract the analysis data from the cloud customer tenancy to the assurance administrator tenancy, without letting the cloud customer know what data is being extracted (referred to as confidentiality of analysis), versus (ii) the cloud customer desires to have some level of monitoring, such as maintaining a list or log of such analysis data being extracted, or monitoring an amount of source code being extracted (referred to as confidentiality of source code). There is a need to meet the above-described conflicting objectives, when the analysis data is extracted from the cloud customer tenancy to the assurance administrator tenancy.

As describe below in detail, in an example, a signature and encryption (SE) service and an intermediate zone facilitate in fulfilling such conflicting objectives of confidentiality of analysis versus confidentiality of source code.

In an example, a transmission service within a transmission zone is responsible for extraction of the analysis data from the analysis service to a reception service of a reception zone within the assurance administrator tenancy. The transmission zone and the reception zone are controlled by the assurance administrator.

In an example, the SE service is executed within the transmission zone. The SE service is also referred to herein as a data loss prevention (DLP) service, as the SE service facilitates in prevention or at least reduction of chances of data loss from the perspective of the cloud customer, as described below in detail. The code for the SE service may be written, compiled, and/or created by the cloud customer, and provided to the transmission zone that is controlled by the assurance administrator. In an example, the cloud customer provides a binary code version of the SE service to the assurance administrator for execution within the transmission zone (e.g., such that the assurance administrator may not fully comprehend the coding and/or inner workings of the SE service, as described below in detail).

In an example, and as described below in further detail, the transmission service provides a cleartext version of the analysis data to the SE service. The SE service encrypts and signs the cleartext analysis data, to generate signed and encrypted data. In an example, the SE service checks to see if a sizeable amount of the source code (such as higher than a threshold amount of source code) or other sensitive data is being extracted as the analysis data, and if so, provides an indication of the same in metadata accompanying the signed and encrypted data. In an example, the SE service may also indicate within the metadata (which accompanies the signed and encrypted data) an amount (such as a number of lines) of source code included within the analysis data. For example, the metadata may include one or more bits (such as a single bit) that have either (i) a first value to indicate that the amount of the source code included within the analysis data in more than a pre-configured threshold value, or (ii) a second value to indicate that the amount of the source code included within the analysis data in less than a pre-configured threshold value. In another example, if the SE service suspects that a sizeable amount of the source code (such as higher than a threshold amount of source code) or other sensitive data is being extracted as the analysis data, the SE service may refuse to sign and encrypt the analysis data, thereby prohibiting extraction of such analysis data. In an example, the SE service may also maintain a list or log of the cleartext analysis data to be extracted.

The cloud customer controls and operates an intermediate zone, through which the signed and encrypted data has to pass, to reach the reception zone from the transmission zone. For example, the signed and encrypted data is passed through a verification service of the intermediate zone controlled by the cloud customer. The verification service verifies a signature of the signed and encrypted data, e.g., to ensure that the SE service has indeed processed the analysis data (or the cleartext data derived from the analysis data). Upon verification of the signature of the signed and encrypted data, the verification service allows passage of the signed and encrypted data to the reception service of the reception zone of the assurance administrator tenancy. In an example, if the metadata accompanying the signed and encrypted data indicates that the analysis data has a sizeable amount of source code (such as higher than a threshold number of lines of source code), the verification service of the intermediate zone controlled by the cloud customer may block passage of the signed and encrypted data to the reception service.

Note that the intermediate zone controlled by the cloud customer is not aware of the contents of the signed and encrypted data being extracted to the assurance administrator tenancy (because the data is encrypted, and the intermediate zone of the cloud customer doesn't have access to keys for decryption). Hence, although the verification service of the intermediate zone verifies the signature of the signed and encrypted data, the verification service doesn't read the actual data. Accordingly, the confidentiality of analysis objective of the assurance administrator is satisfied.

On the other hand, the SE service developed by the cloud customer maintains a log of the analysis data (or the corresponding cleartext data) to be extracted. Later, if necessary, upon mutual agreement between the assurance administrator and the cloud customer, the cloud customer can review the log maintained by the SE service. Additionally (or alternatively), in an example, the SE service checks to see if a sizeable amount of the source code (such as higher than a threshold amount of source code) or other sensitive data is being extracted as the analysis data, and if so, (i) provides an indication of the same in metadata accompanying the signed and encrypted data, or (ii) refuses to sign and encrypt the analysis data. Accordingly, confidentiality of source code objective of the cloud customer is also satisfied, as the cloud customer has some monitoring role on the analysis data being extracted, as the verification service allows passage of the signed and encrypted data only after verifying that the SE service has processed the analysis data and signed the encrypted version of the analysis data.

Accordingly, the conflicting dual objectives of confidentiality of analysis and confidentiality of source code are satisfied in the cloud environment, e.g., by using the SE service and the verification service, as described below in further detail.

In an example, the SE service deployed within the transmission zone may have software bugs, and in some corner cases, may not be able to successfully encrypt and/or sign the analysis data. Example use cases of such software bugs have been described below. The cloud customer, in an example, may not prefer that the transmission service randomly receive debug information from the SE service, without authorization or prior knowledge from the cloud customer. This is because the cloud customer may be apprehensive that by repeatedly and intentionally creating erroneous operation of the SE service and accessing the corresponding debug information, the transmission service (or the personnel of the assurance administrator) may gain insights on inner workings of the SE service, which may aid in reverse engineering of the SE service by the personnel of the assurance administrator. As described below in further detail, the cloud customer may prefer to keep the source code and inner workings of the SE service secret and obscure from the assurance administrator. Thus, the cloud customer may not want any arbitrary debug workflow to debug the SE service.

Accordingly, in some examples, the transmission service may query the SE service for debug information only after receiving a debug token from a debug service being executed within the intermediate zone of the cloud customer. For example, when the transmission service suspects erroneous operation of the SE service, the transmission service requests a debug token from the debug service. The debug service issues the debug token to the transmission service. The transmission service may now query the SE service for the debug information using the debug token. The debug information received by the transmission service from the SE service includes information that may facilitate in debugging the SE service. In an example, the transmission service transmits the debug information to the debug service of the cloud customer, for debugging the SE service. Thus, the debug information is output by the SE service only after reception and verification of the debug token. Hence, the transmission service cannot randomly request and receive the debug information from the SE service. Rather, the transmission service has to obtain authorization from the intermediate zone controlled by the cloud customer (such as from the debug service) in the form of the debug token, in order to receive the debug information from the SE service. This limits a number of times debug information can be obtained by the transmission service from the SE service. Thus, the debug service within the intermediate zone facilitates in the cloud customer having some degree of monitoring and control on the debug information received by the transmission service from the SE service. The debug workflow has been described below in further detail.

In an example, the SE service includes an encryption service that performs an encryption operation on the analysis data (or a cleartext form of the analysis data) using one or more encryption keys, to generate encrypted data. The SE service also executes a signature generation service that performs a signature operation on the encrypted data, to generate the signed and encrypted data. The signature generation service may use any appropriate type of algorithm or cryptography techniques for generation of the signature. The signature of the signed and encrypted data includes (i) a signature field including verifiable contents of the signature (e.g., which may be verified later by the verification service) and (ii) one or more side channels that supposedly include random numbers. In an example, the random numbers within the side channels may be used to obfuscate the signature field, such that a malicious component may not be able to distinguish between the signature field and the random numbers (e.g., without knowing a-priori which bits of the signature represent the signature field and which bits of the signature represent the side channels). As described above, there may be a mutual distrust between the assurance administrator and the cloud customer. In an example, the assurance administrator may be apprehensive that the SE service (which is developed by the cloud customer) may leak sensitive information, e.g., by posing the sensitive information as the supposedly random numbers of the side channels of the signature. For example, the assurance administrator may be apprehensive that the signature generation service may include, instead of the random numbers, sensitive information within the side channels. An example of such sensitive information includes an encryption key supplied by the transmission service to the SE service to encrypt the data.

If the encryption key is leaked in such a manner by the SE service using the side channels of the signature of the signed and encrypted data, the verification service (which is controlled by the cloud customer) may later read the encryption key when verifying the signature. Accordingly, the cloud customer may use the encryption key to decrypt the signed and encrypted data, and read the analysis data being extracted, thereby defeating the confidentiality of analysis objective of the assurance administrator.

In an example, the transmission service includes a signature verification service. When the transmission service receives the signed and encrypted data and metadata from the SE service, the signature verification service verifies that the signature of the signed and encrypted data is not used to extract any sensitive data from the SE service to the verification service of the intermediate zone.

For example, the assurance administrator and the cloud customer may have a mutual agreement on a format of the signature, such as a mutual agreement on a maximum length of the side channels of the signature. In an example, the mutual agreement may dictate that a length Lsc of the side channels cannot exceed a pre-agreed threshold length Lth. In an example, the threshold length Lth is less than a length of the encryption key. Accordingly, because Lsc≤Lth, the length Lsc is supposed to be less than a length of the encryption key provided to the SE service to encrypt the data. Because the length Lsc of the side channels is supposed to be less than the length of the encryption key, the encryption key cannot be extracted by posing as random numbers within the side channels. In an example, the length Lsc of the side channels may be constrained by selecting an appropriate cryptographic technique for generating the signature, and/or by configuring the cryptographic technique to tune the length of the signature and/or the length Lsc of the side channels. In an example, when the transmission service receives the signed and encrypted data and metadata from the SE service, the signature verification service verifies that the length Lsc of the side channels of the signature of the signed and encrypted data has not exceeded the pre-agreed threshold length Lth. In an example, most portion of the signed and encrypted data (such as the signature field) may be deterministically validated by the signature verification service (e.g., by ensuring that they include the signature bits as expected). Portions of the signed and encrypted data, which may not be deterministically validated, may be random numbers of the side channels. Accordingly, in an example, the signature verification service may determine a length Lsc of the portions of the signed and encrypted data that may not be deterministically validated, and ensure that this length Lsc does not exceed the pre-agreed threshold length Lth.

However, in an example, even if it is ensured that the length Lsc does not exceed the pre-agreed threshold length Lth, this still leaves a possibility that sensitive information (such as an encryption key) can be leaked over side channels of a plurality of signatures of a stream of signed and encrypted data transmitted by the transmission service to the reception service through the intermediate zone. Each such signed and encrypted data has corresponding one or more side channels. For example, the assurance administrator may be apprehensive that the SE service may attempt to use a combined length of a plurality of such side channels, such as two or more of the side channels of two or more signatures of two or more instances of signed and encrypted data, to leak an encryption key. For example, a first subset of the encryption key may be leaked as supposedly random numbers of first side channels of a first signature, and a second subset of the encryption key may be leaked as supposedly random numbers of second side channels of a second signature, such that the entire encryption key is leaked over two different side channels associated with two different instances of the signed and encrypted data.

In an example, to prevent or at least reduce the possibility of such leakage of sensitive information, the SE service is designed to be ephemeral in nature. For example, the SE service, due to its ephemeral nature, cannot preserve its state between two consecutive encryption and signature operations. For example, assume that the SE service has a first state during generating of first signed and encrypted data. The first state is expunged or forgotten by the SE service, after the generation of the first signed and encrypted data. Accordingly, when generating a second signed and encrypted data, the SE service does not preserve the first state or has access to the first state. The SE service forgets a state of the SE service, after generation of an instance of the signed and encrypted data. This prevents or reduces chances of the SE service using side channels of a plurality of signatures of a stream of signed and encrypted data to leak sensitive information, such as an encryption key, as described below in further detail.

FIG. 1 illustrates a block diagram of a cloud environment 100 comprising (i) a first tenancy 102 including a transmission zone 116, and (ii) a second tenancy 103 including a reception zone 150, wherein signed and encrypted data 116 is transmitted from the transmission zone 116 of the first tenancy 102 to the reception zone 150 of the second tenancy 103, via an intermediate zone 130 that verifies a signature of the signed and encrypted data 116.

A provider of the cloud environment 100 provides on-demand, scalable computing resources (a cloud environment) to its cloud customers. The cloud provider provides each cloud customer a "tenancy." A tenancy is an isolated partition within the cloud environment 100, such that resources in different tenancies are isolated from each other unless explicitly shared. A tenancy of a cloud customer is isolated from another tenancy of another cloud customer. An administrator of a tenancy has administrative rights to set access policies for cloud resources in the tenancy; an administrator of a tenancy does not have administrative rights to set access policies for cloud resources in another tenancy.

In an example, the cloud environment 100 comprises a tenancy 101 that includes one or more repositories for storing source code 106 of one or more programs. For example, the tenancy 101 may be rented out to a cloud customer, and may be a cloud customer tenancy. The cloud customer develops the source code 106, which may be source code for any appropriate programs. Merely as an example, the source code 106 may be for a mobile application ("mobile app") that is to be deployed in a plurality of mobile devices. In another example, the source code 106 may be for a server-side cloud application that is to be deployed in a cloud-based server of the cloud customer.

In one example, the source code 106 may be processed through a build pipeline to generate software packages including binary version of the source code. In an example, the build pipeline may be developed and/or operated solely or at least in part jointly by the cloud customer and/or an assurance administrator. Merely as an example, if the source code 106 is for the application deployable to the plurality of mobile devices, then the build pipeline may be operated by the assurance administrator (or jointly by the cloud customer and the assurance administrator, with one or both party having some degree of monitoring role in the build process). In another example, if the source code 106 is for server-side backend application, then the build pipeline may be operated by the cloud customer (or jointly by the cloud customer and the assurance administrator, with one or both party having some degree of monitoring role in the build process). Such joint or sole operation of the build pipeline may be implementation specific. The software packages generated by the build pipeline and including binary version of the source code may then be deployed to a plurality of mobile devices. In another example, the source code 106 represents the software packages including binary version of code that are deployable to a plurality of mobile devices. In any case, the source code 106 represent code that are in any stage of being build in a software package, such as prior to being tested, packaged, and built in deployable software packages, or the final deployable software packages, or at any stage of being tested, packaged, and built in deployable software packages, for example.

In a typical scenario, a cloud customer renting the tenancy 101 may develop the source code 106, test, build, and package the source code 106, and deploy the source code 106 to a plurality of mobile devices. However, in the cloud environment 100, in the context of software assurance, an additional role of an assurance administrator is added into the picture. The assurance administrator may or may not be the same as the cloud provider. In an example, the assurance administrator acts as a "trusted technology provider" (TTP). With regard to the subject disclosure, in an example, the assurance administrator has a monitoring role over a manner in which the cloud customer is using the cloud resources. Merely as an example, the assurance administrator may want to monitor the source code 106, to ensure that the cloud customer is compliant with guidelines mutually agreed between the cloud customer and the assurance administrator, although other example monitoring use cases (such as reasons behind such monitoring) may also be possible. In an example, the assurance administrator may be tasked by a government regulatory agency to monitor the source code 106, e.g., to ensure that the source code 106 adheres to regulatory guidelines established by the government regulatory agency.

For example, as a part of such software assurance, the assurance administrator may want to review and analyze the source code 106, and/or review and analyze various logs, messages, reports, etc. generated within the cloud customer tenancy 101. Detected anomalies or issues may be reported back to the assurance administrator. For example, detected anomalies or issues may be reported to a reception service 154 within a reception zone 150 of the tenancy 103, and may be further analyzed by a detailed analysis services 158.

The assurance administrator processes such anomalies or issues, and may negotiate with the cloud customer to fix the detected anomalies or issues. In an example, if the anomalies or issues indicate security risks, the assurance administrator may escalate the anomalies or issues, and may even report the anomalies or issues to a higher reporting authority (such as the government regulatory agency). Software assurance actions taken by the assurance administrator may be implementation specific, and may vary from one implementation to the next.

In any case, the tenancy 102 includes analysis services 108 configured to analyze the source code 106 and/or various logs, messages, reports, etc. within the cloud customer tenancy 101, and to generate data 112 based on such analysis. For example, the analysis services 108 perform various types of testing and/or analysis of the source code 106 and/or performs any other type of analysis and/or testing within the tenancy 101, and generate data 112. The data 112 refers to any data that the analysis services 108 gather from the tenancy 101, and aim to extract to the tenancy 103 using techniques described herein.

Examples of such data 112 include analytical data generated based on analysis of the source code 106 within the cloud customer tenancy 101, actual lines of the source code 106, log files from the tenancy 101, messages from the tenancy 101, and/or any other type of relevant data that is to be extracted to the tenancy 103 for purposes of further analysis by the detailed analysis services 158.

In an example, the tenancy 103 is controlled by the assurance administrator, and hence, the tenancy 103 is referred to herein as an "assurance administrator tenancy 103." On the other hand, the tenancy 101 may be rented out to the cloud customer, and hence, the tenancy 101 is referred to herein as a "cloud customer tenancy 103." In an example, the tenancy 102 may also be controlled by the assurance administrator.

In an example, one or more personnel engaged by the assurance administrator may operate the analysis services 108, and facilitate in gathering the data 112. For example, personnel engaged by the assurance administrator use various types of analysis techniques on the source code 106 and/or the tenancy 101, to identify vulnerability and/or bug reports associated with the source code 106, snippets of the source code 106, and/or associated log files, messages, or other associated data to be extracted to the tenancy 103 as data 112. Examples of such analysis techniques may include manual code review, testing, static analysis tools, etc. In another example, a subset of the source code 106 (such as relatively small code snippets) may be extracted to the tenancy 103 to support detection of software bugs, vulnerabilities, and/or the like. This disclosure is not limited to any specific type of analysis performed on resources within the customer tenancy 101, nor is limited to any specific type of data extracted to the tenancy 103.

In an example, the assurance administrator may not immediately want to share with the cloud customer the actual data 112 being transmitted from the cloud customer tenancy 101 to the assurance administrator tenancy 103, and may want to maintain "confidentiality of analysis" of the data 112 for at least a short period of time. Note that the assurance administrator may eventually share the extracted data 112 at a later stage with the cloud customer (e.g., after the assurance administrator, such as the detailed analysis services 158, has reviewed and analyzed the data 112 more thoroughly at the tenancy 103). Note that the assurance administrator controls the analysis services 108, the transmission zone 116, and the reception zone 150. Accordingly, the assurance administrator, and hence, the analysis services 108 and/or 158, the transmission zone 116, and the reception zone 150 have the objective of "confidentiality of analysis" of the data 112, whereby these components may want to obfuscate or conceal actual contents of the data 112 to be extracted to the assurance administrator tenancy 103.

However, the cloud customer may want to have at least some monitoring and/or control over the extraction of the data 112 from the cloud customer tenancy 101 to the assurance administrator tenancy 103. For example, the source code 106 is developed by the cloud customer, and is the intellectual property of the cloud customer. Accordingly, the cloud customer may prefer to maintain confidentiality of the source code. For example, the cloud customer may want to at least have a list or log of the data 112 to be extracted from the tenancy 101 to the tenancy 103, and/or may want to ensure that sizeable amount of source code 106 (such as greater than a threshold number of lines of source code 106) is not extracted from the tenancy 101 to the tenancy 103. This is referred to as the cloud customer's desire to maintain "confidentiality of the source code 106."

Accordingly, there is a level of mutual distrust between the assurance administrator and the cloud customer, and there are conflicting objectives between the goals of the cloud customer and the assurance administrator—(i) the assurance administrator desires to extract data 112 from the cloud customer tenancy 101 to the assurance administrator tenancy 103, without letting the cloud customer know what data is being moved (confidentiality of analysis), versus (ii) the cloud customer desires to have some level of monitoring, such as maintaining a log of such data 112 being extracted (confidentiality of source code 112). There is a need to meet the above-described conflicting objectives, when the data 112 is extracted from the cloud customer tenancy 101 to the assurance administrator tenancy 103. As describe below in detail, in an example, a signature and encryption (SE) service 124 and the intermediate zone 130 facilitate fulfilling such conflicting objectives of confidentiality of analysis versus confidentiality of source code 112.

In an example, the transmission zone 116 executes the SE service 124. The code for the SE service 124 may be written, compiled, and/or created by the cloud customer, and provided to the transmission zone 116 that is controlled by the assurance administrator. In an example, the cloud customer provides a binary code version of the SE service 124 to the assurance administrator for execution within the transmission zone 116. Thus, the source code of the SE service 124 is not provided to the assurance administrator, such that the assurance administrator may not fully comprehend the coding and/or inner workings of the SE service 124. This maintains confidentiality of the SE service 124, as the SE service 124 is developed by the cloud customer, and the cloud customer may not want the assurance administrator to have an understanding of the inner workings of the SE service 124. For example, if the assurance administrator accesses or reverse engineers the source code of the SE service 124, the cloud customer may be apprehensive that the assurance administrator may tweak or adjust the SE service 124, e.g., to find ways to at least partially circumvent the SE service 124 and extract unauthorized data from the tenancy 102 to the tenancy 103, without knowledge of the cloud customer. Accordingly, in an example, the cloud customer provides the binary code version of the SE service 124 (and not the source code of the SE service 124) to the assurance administrator for execution within the transmission zone 116.

In an example, as described below in further detail, the SE service 124 is introduced within the transmission zone 116, where the SE service 124 encrypts and signs a cleartext data 114 generated form the data 112, to generate signed and encrypted data 116. In an example, the SE service 124 maintains a list or log 125 of data 112 being extracted from the tenancy 101 to the tenancy 103. In an example, the SE service 124 checks to see if a sizeable amount of the source code 106 (such as higher than a threshold amount of source code) or other sensitive data is being extracted as the cleartext data 114, and if so, provides an indication of the same in metadata 117 accompanying the signed and encrypted data. In an example, the SE service 124 may also indicate within the metadata 117 (which accompanies the signed and encrypted data 116) an amount (such as a number of lines) of source code 106 included within the cleartext data 114. In another example, if the SE service 124 suspects that a sizeable amount of the source code 106 (such as higher than a threshold amount of source code) or other sensitive data is being extracted as the cleartext data 114, the SE service 124 may refuse to sign and encrypt the cleartext data 114, thereby prohibiting extraction of such data 114. Once the SE service 124 signs and encrypts the data, the signed and encrypted data 116 is passed through a verification service 134 of the intermediate zone 130 controlled by the cloud customer. The verification service 134 verifies a signature of the signed and encrypted data 116, e.g., to ensure that the SE service 124 has indeed processed the data 112 (or the cleartext data 114 derived from the data 112). Upon verification of the signature of the signed and encrypted data 116, the verification service 134 allows passage of the signed and encrypted data 116 to the reception service 154 of the reception zone 150 of the tenancy 103. In an example, if the metadata 117 accompanying the signed and encrypted data 116 indicates that the cleartext data 114 had a sizeable amount of source code (such as higher than a threshold number of lines of source code), the verification service 134 may block passage of the signed and encrypted data 116 to the reception service 154 (although the verification service 134 may not be able to see the actual codes being extracted). Thus, the intermediate zone 130 controlled by the cloud customer is not aware of the contents of the signed and encrypted data 116 (as it is encrypted) being extracted to the tenancy 103, and hence, the confidentiality of analysis objective of the assurance administrator is satisfied. On the other hand, the SE service 124 developed by the cloud customer maintains a log 125 of the data 112 (or the corresponding cleartext data 114) to be extracted. Later, if necessary, upon mutual agreement between the assurance administrator and the cloud customer, the cloud customer can review the log 125 maintained by the SE service 124. Furthermore, the SE service 124 prevents or at least reduces chances of large amount of source code 106 being extracted to the reception service 154, as described above. Accordingly, confidentiality of source code 112 objective of the cloud customer is also satisfied. Accordingly, the conflicting dual objectives of confidentiality of analysis and confidentiality of source code 112 are satisfied in the cloud environment 100, e.g., by using the SE service 124 and the verification service 134.

Figure 2:
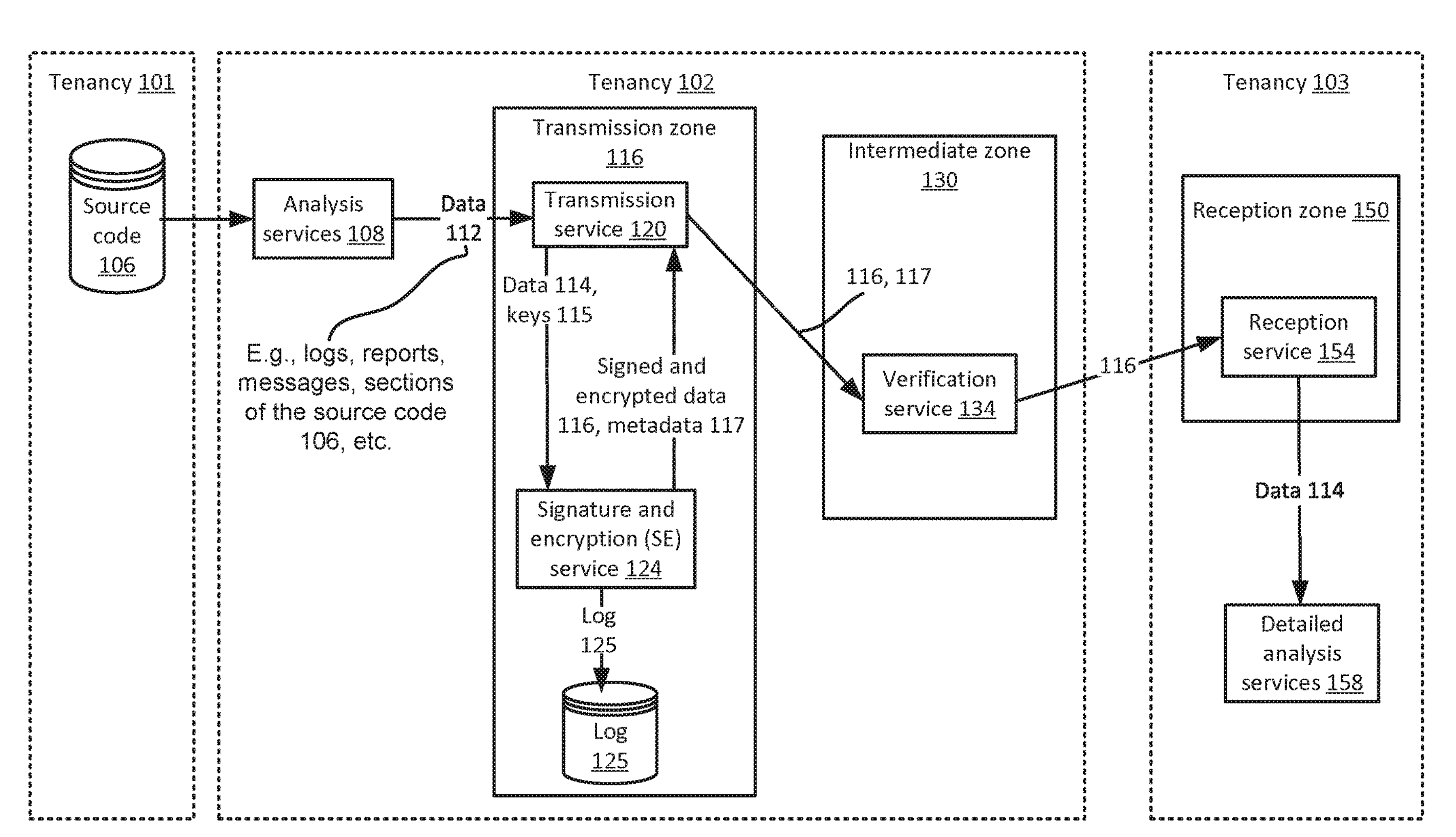
FIG. 2 illustrates another cloud environment that is a variation of the cloud environment of FIG. 1, wherein in the cloud environment of FIG. 2, a transmission zone and an intermediate zone are within a same tenancy.

Note that in FIG. 1, the transmission zone 116 and the intermediate zone 104 are illustrated to be include within the tenancies 102 and 104, respectively, of the cloud environment 101. However, in an example, the transmission zone 116 and the intermediate zone 104 may be in the same tenancy, as illustrated in FIG. 2. FIG. 2 illustrates a cloud environment 200 that is a variation of the cloud environment 100 of FIG. 1, wherein in the cloud environment 200 of FIG. 2, the transmission zone 116 and the intermediate zone 130 are within the same tenancy 102. Similar to the cloud environment 100 of FIG. 1, in the cloud environment 200 of FIG. 2, the extraction of the data 112 (e.g., in the cleartext, encrypted, and signed format) is from a first tenancy 102 to a second tenancy 103. Description with respect to the cloud environment 100 of FIG. 1 provided herein, unless contradictory in nature, also applies to the cloud environment 200 of FIG. 2.

Figure 3A:
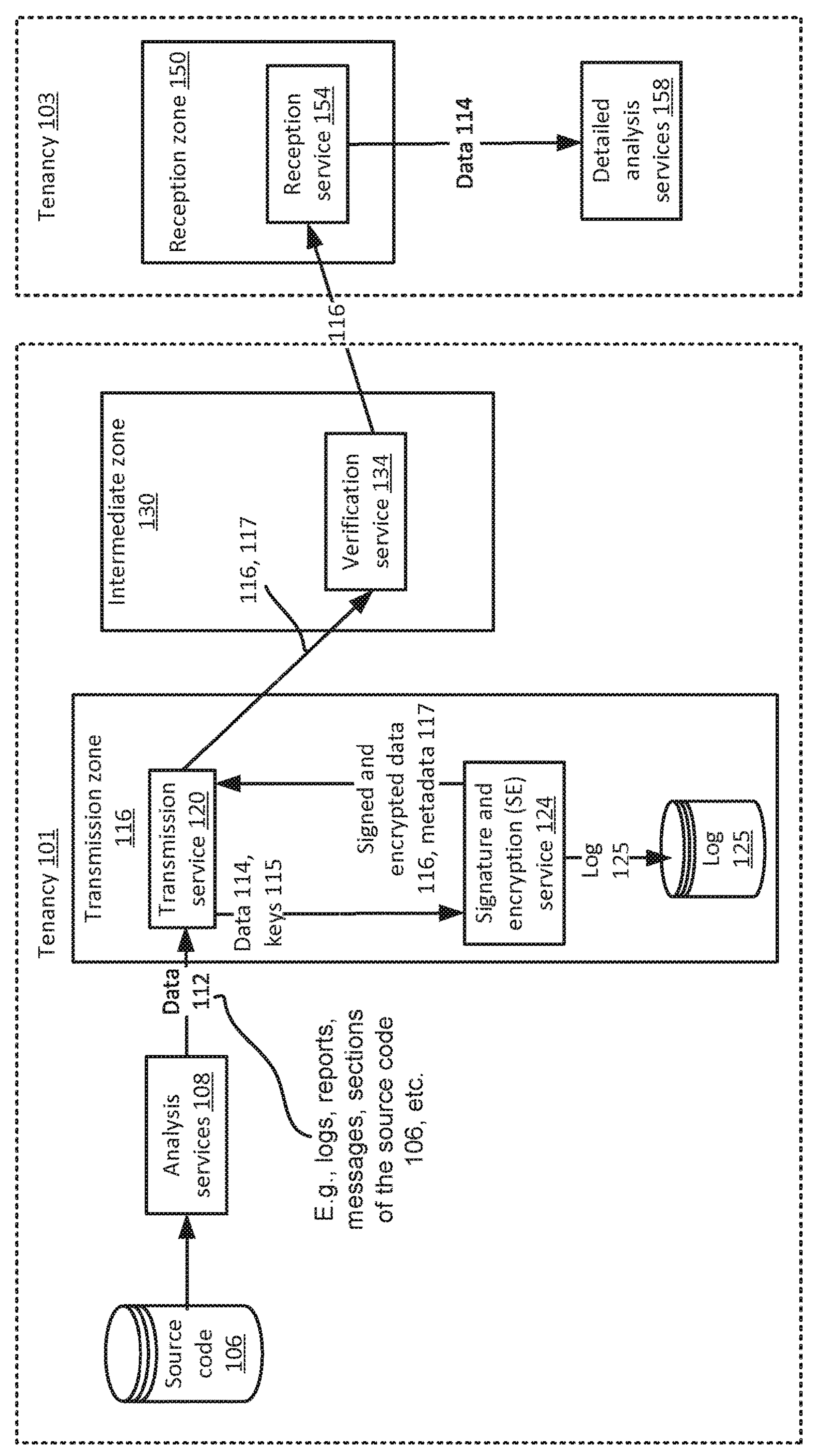
FIG. 3A illustrates a cloud environment that is a variation of the cloud environment of FIG. 1, wherein in the cloud environment of FIG. 3A, one or more repositories for a source code and a transmission zone are within a same tenancy.

Note that in FIG. 1, the repositories for the source code 106 are within the tenancy 101 and the transmission zone 116 are in the tenancy 102. However, in an example, the repositories for the source code 106 and the transmission zone 116 may be within the same tenancy, as illustrated in FIG. 3A. FIG. 3A illustrates a cloud environment 300*a* that is a variation of the cloud environment 100 of FIG. 1, wherein in the cloud environment 300*a* of FIG. 3A, repositories for the source code 106 and the transmission zone 116 are within a same tenancy 101. Thus, similar to the cloud environment 100 of FIG. 1, in the cloud environment 300*a* of FIG. 3A, the extraction of the data 112 (e.g., in the cleartext, encrypted, and signed format) is from a first tenancy 101 to a second tenancy 103. Description with respect to the cloud environment 100 of FIG. 1 provided herein, unless contradictory in nature, also applies to the cloud environment 300*a* of FIG. 3A.

Figure 3B:
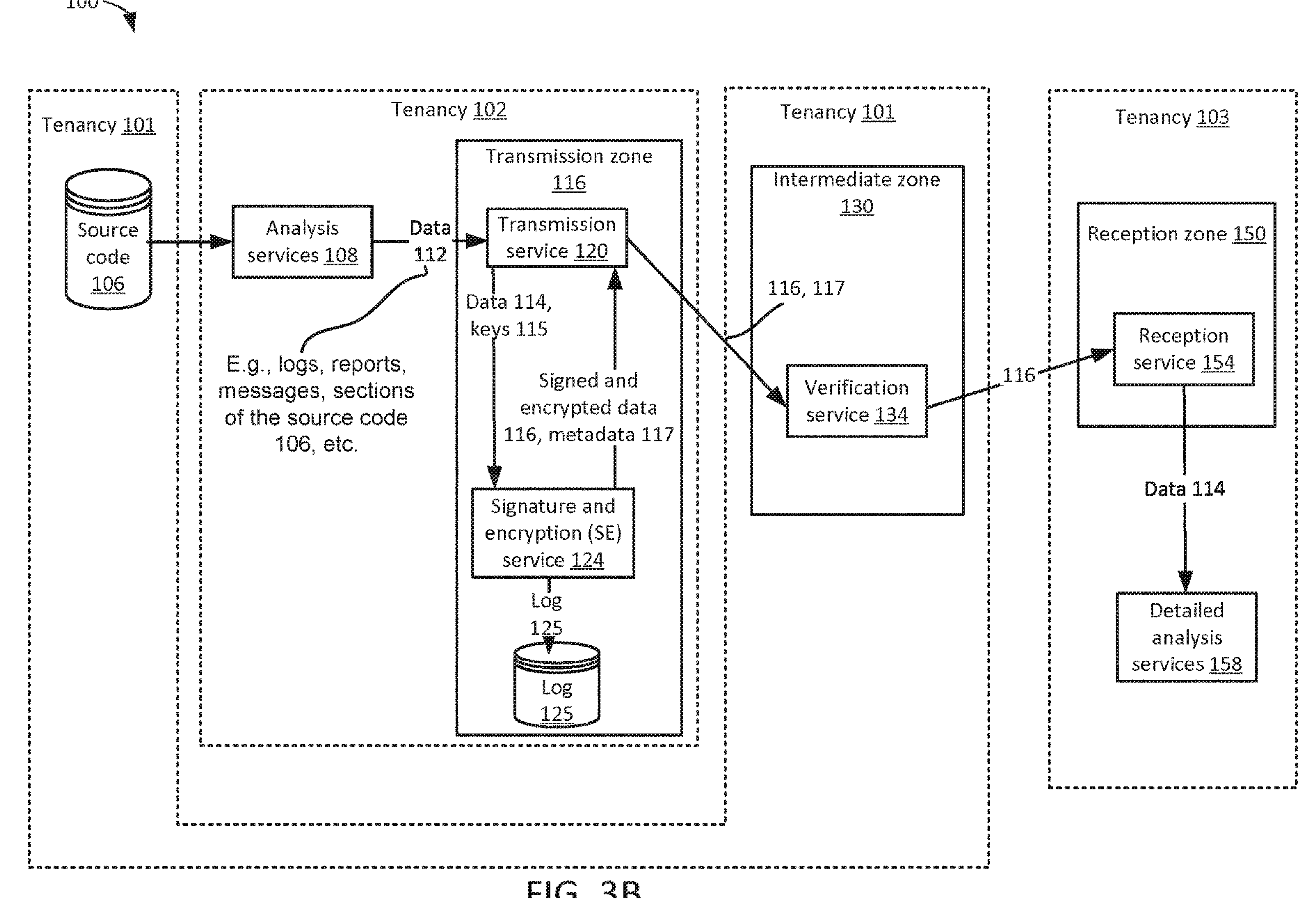
FIG. 3B illustrates a cloud environment that is a variation of the cloud environment of FIG. 1, wherein in the cloud environment of FIG. 3B, repositories for a source code and an intermediate zone are within a same tenancy.

Note that in FIG. 1, the repositories for the source code 106 are within the tenancy 101 and the intermediate zone 130 is in the tenancy 104. However, in an example, the repositories for the source code 106 and the intermediate zone 130 may be within the same tenancy, as illustrated in FIG. 3B. FIG. 3B illustrates a cloud environment 300*b* that is a variation of the cloud environment 100 of FIG. 1, wherein in the cloud environment 300*b* of FIG. 3B, repositories for the source code 106 and the intermediate zone 130 are within a same tenancy 101. Thus, similar to the cloud environment 100 of FIG. 1, in the cloud environment 300*b* of FIG. 3B, the extraction of the data 112 (e.g., in the cleartext, encrypted, and signed format) is from a first tenancy 101 to a second tenancy 103. Description with respect to the cloud environment 100 of FIG. 1 provided herein, unless contradictory in nature, also applies to the cloud environment 300*b* of FIG. 3B.

Figure 4:
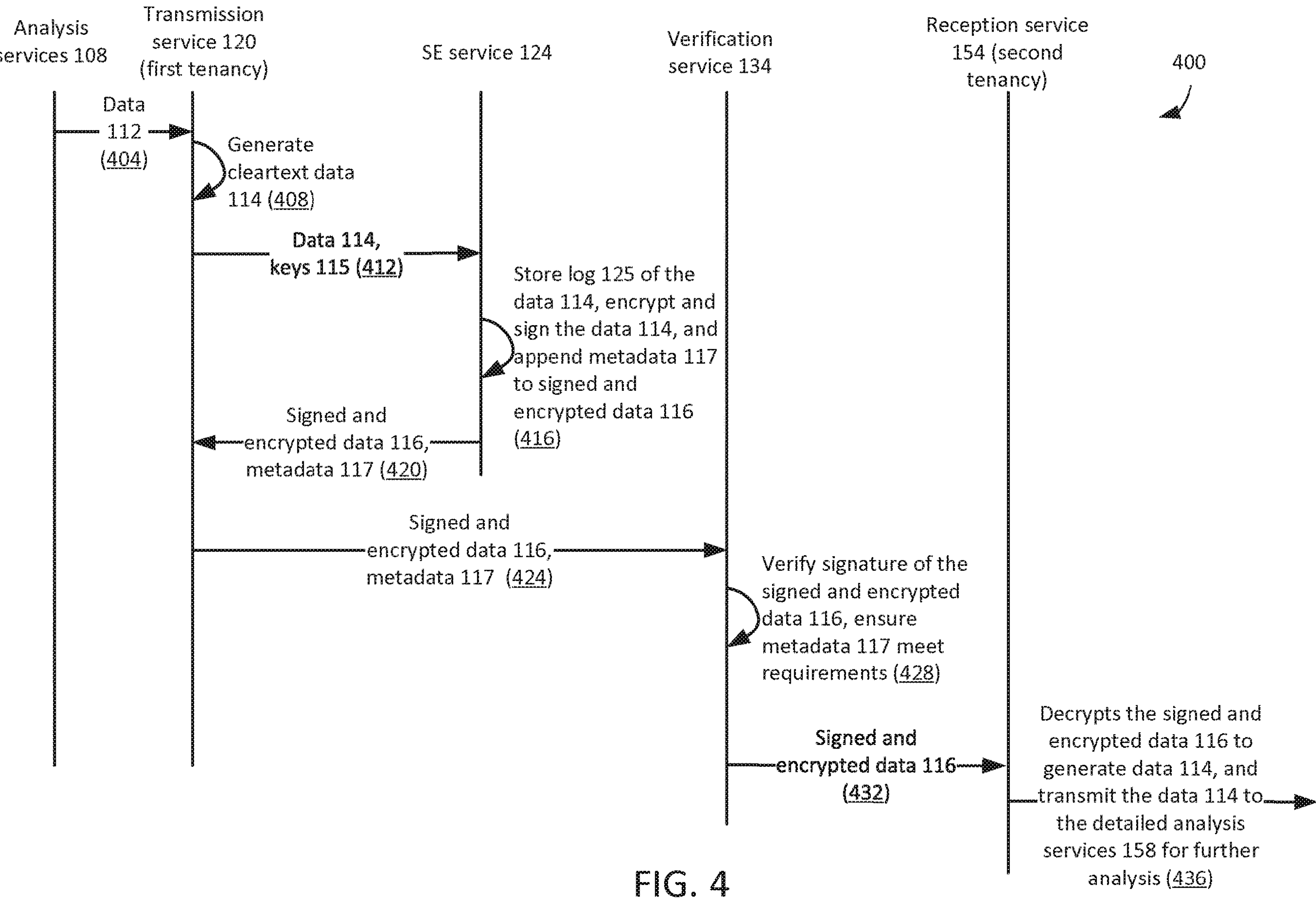
FIG. 4 illustrates a flow diagram depicting an example extraction of data from a transmission zone of a first tenancy to a reception zone of a second tenancy, via an intermediate zone.

FIG. 4 illustrates a flow diagram 400 depicting an example extraction of data 112 from a transmission zone 120 of a first tenancy (such as the tenancy 102 of the cloud environments 100, 200, or 300*b* of FIG. 1, 2, or 3B, or the tenancy 101 of the cloud environment 300*a* of FIG. 3A) to a reception zone 150 of a second tenancy (such as the tenancy 103 of the cloud environments 100, 200, 300*a*, 300*b* of FIGS. 1-3B), via an intermediate zone 130. The flow diagram 400 of FIG. 4 is described below with respect to the cloud environment 100 of FIG. 1, but is also applicable to the cloud environments 200, 300*a*, and 300*b* of FIGS. 2-3B as well.

Referring to FIGS. 1 and 4, in an example, the data 112 gathered by the analysis services 108 are transmitted to the transmission service 120, labelled as operation 404 in FIG. 4. Examples of the data 112 have been described above.

As also described above and illustrated as operation 408 in FIG. 4, the transmission service 120 generates cleartext data 114 from the data 112. In an example where the data 112 is in cleartext form, the data 112 and the data 114 are the same. In another example where the data 112 is not in cleartext form, the formatting of the data 112 and the cleartext data 114 may be different. However, both data 112 and 114 include the same content or the same information from a software assurance point of view. Data 112 and 114 are used herein interchangeably, although it should be appreciated by those skilled in the art that the data 114 is the cleartext counterpart of the data 112 (although the data 112 may also be in cleartext format in some examples).

In an example and illustrated as operation 412 in FIG. 4, the transmission service 120 transmits the cleartext data 114 and one or more keys 115 to the SE service 124. The keys 115 are encryption keys known to and maintained by the assurance administrator (such as the transmission service 120), and are not known to the cloud customer. Thus, for example, the transmission service 120 and the reception service 154 know the keys 115 (e.g., the reception service 154 has keys to decrypt the data that is encrypted using the keys 115), but the verification service 134 is unaware of the keys 115 (or unaware of decryption keys to decrypt the data).

In an example, the SE service 124 is developed by the cloud customer, and the cloud customer may have occasional access to the SE service 124, e.g., under supervision of the assurance administrator. However, in an example, the SE service 124 may not be able to transmit the keys 115 (or the log 125) to the verification service 134. Various techniques have been described below to prevent or deter the SE service 124 from transmitting the keys 115 to the verification service 134. For example, the SE service 124 can communicate with the transmission service 120, and may not be able to communicate directly with the verification service 134 (or to another service of the cloud customer), bypassing the transmission service 120. For example, the SE service 124 may not have network access to communicate with any component outside the transmission zone 116. Accordingly, the SE service 124 cannot transmit the keys 115 (or the log 125) to the verification service 134 (or to another service of the cloud customer). Also described herein later are various techniques to prevent or reduce chances of key leakage from the SE service 124 to the verification service 134 (or to another service of the cloud customer).

In an example and illustrated as operation 416 in FIG. 4, the SE service 124 stores log 125 of the data 114 in a repository accessible to the SE service 124, encrypts and signs the data 114 using the keys 115 to generate the signed and encrypted data 116, and appends metadata 117 to the signed and encrypted data 116. For example, the log 125 of the data 114 stored by the SE service 124 and/or the metadata 117 may include any appropriate type of information associated with the data 114. Note that in contrast to the data 114 which is encrypted and signed, the metadata 117 is not encrypted in an example (although at least a section of the metadata 117 may be encrypted in another example, as described below in further detail).

In an example, the log 125 of the data 114 stored by the SE service 124 may include the cleartext data 114 that is to be extracted. The entire cleartext data 114 to be extracted may be stored in the log 125, and/or a high-level summary of the cleartext data 114 may be stored in the log 125. Note that the log 125 maintained by the SE service 124 may not be generally or immediately accessible to the cloud customer. For example, the cleartext data 114 may be a subset of the source code 106 (such as code snippets), which is to be eventually analyzed by the detailed analysis services 158 in the tenancy 103, e.g., to facilitate detection of software bugs, vulnerabilities, and/or the like. Once the result of the detailed analysis is known to the assurance administrator, the assurance administrator may undertake actions accordingly. For example, if the source code 106 has minor violation of agreement between the assurance administrator and the cloud customer, the assurance administrator may request the cloud customer to fix such issues. For major violations, the issue may be escalated, and may even be reported to a government regulatory agent regulating operations of the cloud customer. In any case, after the detailed analysis services 158 complete their analysis, the assurance administrator may share with the cloud customer the data 112 (such as the subset of the source code 106 or the code snippets) that was extracted from the tenancy 102 to the tenancy 103. In case of any dispute between the assurance administrator and the cloud customer regarding how much of the source code 106 was actually extracted to the tenancy 103, the log 125 stored by the SE service 124 may act as a proof of the subset of the source code 106 that was extracted to the tenancy 103. Accordingly, after the detailed analysis services 158 complete their analysis, and in case of the above-described dispute between the assurance administrator and the cloud customer, the log 125 may be referred to resolve such disputes.

In another example, if the cleartext data 114 includes one or more log messages and/or other types of information, such information may also be stored within the log 125 maintained by the SE service 125. For example, the cleartext data 114 may include analysis findings (e.g., from one or more static analysis tools) performed by the analysis service 108, in addition to (or instead of) the cleartext data 114 including code snippets. As described above, the log 125 may not be available to the verification service 134, when the verification service 134 provides passage of the signed and encrypted data 116 from the transmission service 120 to the reception service 154.

In contrast, the metadata 117 is visible and readable by the verification service 134, when the verification service 134 provides passage of the signed and encrypted data 116 from the transmission service 120 to the reception service 154. Accordingly, the metadata 117 may include less sensitive information than the log 125.

In an example, the metadata 117 may include one or more attributes of the data 112. In one example where the data 114 includes a plurality of lines of the source code 106, the metadata 117 includes a number of lines (or number of words, or a hash value) of the source code 106 that is within the data 114. Thus, for example, the data 112 includes a subset or snippet of the source code 106, and the metadata 117 quantifies the subset or snippets of the source code included within the data 114 (e.g., provides the number of lines or the number of words of the source code included within the data).

In another example, the metadata 117 includes an indication of one or more types of information within the data 114 (such as whether the data 114 includes a subset of the source codes 106, or log messages, or reports, and/or other types of data).

Note that in contrast to the data 114 which is encrypted and signed, the metadata 117 is not encrypted by the SE service 124 in an example, such that the metadata 117 may be read by the verification service 134. In another example, at least a section of the metadata 117 is encrypted by the SE service 124. For example, the SE service 124 encrypts at least the section of the metadata 117 using a key that is different from the keys 115. For example, the key used to encrypt at least the section of the metadata 117 may be known to the SE service 124 and the verification service 134 of the cloud customer, and may be unknown to the assurance administrator. This way, the SE service 124 can transmit some information to the verification service 134, without the assurance administrator being aware of the information. An example of such information may include an indication of an amount of the source code 106 (such as a number of lines of the source code, or a number of words of the source code, or a hash value of the source code) that the SE service 124 has detected within the data 114. If the amount of the source code 106 within the data 114 is above a threshold value, the SE service 124 may indicate that too within the metadata 117, and such indication may also be encrypted. For example, the metadata 117 may include one or more of (i) a first portion providing indication of the amount of the source code 106 included within the data 114 and (ii) a second portion providing indication of whether the amount of the source code 106 included within the data 114 in more than a pre-configured threshold value. In an example, the first portion and the second portion of the metadata 117 are encrypted. In another example, the metadata 117 includes only the second portion, and the second portion of the metadata 117 is encrypted. In any case, the encryption uses a key that is (i) known to the SE service 124 and the verification service 134 of the cloud customer, and unknown to the assurance administrator, and (ii) different from the keys 115.

In an example, there may be chances of leakage of the keys 115 through the encrypted portion of the metadata 117 (possibilities of key leakage are described below in further detail). In an example, to prevent or at least reduce chances of leakage of the keys 115 through the encrypted portion of the metadata 117, the portion of the metadata 117 that is encrypted is configured to be less than a threshold value, such as less than two bytes, or one byte, or 4 bits, or 2 bits, or a single bit. For example, the single bit may have either (i) a first value to indicate that the amount of the source code 106 included within the data 114 is more than a pre-configured threshold value, or (ii) a second value to indicate that the amount of the source code 106 included within the data 114 is less than the pre-configured threshold value. The verification service 134 decrypts the portion of the metadata 117, and determines whether the amount of the source code 106 included within the data 114 in less than, or more than, the pre-configured threshold value. If the amount of the source code 106 included within the data 114 is less than the pre-configured threshold value, the verification service 134 allows passage of the signed and encrypted data 116 to the reception service 154. However, if the amount of the source code 106 included within the data 114 in more than the pre-configured threshold value, the verification service 134 may block passage of the signed and encrypted data 116 to the reception service 154. In an example, the metadata 117 may be encrypted, to deter the transmission service 120 to tamper with the metadata 117 and/or to deter the transmission service 120 from knowing the analysis results performed by the SE service 124 (where the analysis performed by the SE service 124 pertains to determining an amount of source code 106 included within the data 114).

The operations of the flow diagram 400 of FIG. 4 proceeds from 416 to 420, where the SE service 124 transmits the signed and encrypted data 116 and the metadata 117 to the transmission service 120.

The operations of the flow diagram 400 of FIG. 4 proceeds from 420 to 424, where the transmission service 120 transmits the signed and encrypted data 116 and the metadata 117 to the verification service 134 within the intermediate zone 130. As described above, the intermediate zone 130 is under the control of the cloud customer.

At 428 of the flow diagram 400 of FIG. 4, the verification service 134 (*i*) verifies the signature of the signed and encrypted data 116, and (ii) ensures that the metadata 117 meet transmission requirements.

For example, the verification service 134 reads the signature of the signed and encrypted data 116, and ensures that the signed and encrypted data 116 is indeed signed by the SE service 124. Ensuring that the SE service 124 has signed the signed and encrypted data 116 results in the cloud customer ensuring that the SE service 124 has read the data 114 and maintained a log 125 of the data 114, which can be later accessed and verified by the cloud customer, e.g., if a dispute arises between the assurance administrator and the cloud customer regarding a type and/or an extent of the data 114 extracted to the tenancy 103. Additionally or alternatively, in an example, if the metadata 117 accompanying the signed and encrypted data 116 indicates that the cleartext data 114 had a sizeable amount of source code (such as higher than a threshold number of lines of source code), the verification service 134 may block passage of the signed and encrypted data 116 to the reception service 154 (although the verification service 134 may not be able to see the actual codes being extracted). This satisfies the above-described confidentiality of the source code requirement of the cloud customer.

However, although the verification service 134 verifies the signature of the signed and encrypted data 116, the verification service 134 cannot read the data 114 that is encrypted within the signed and encrypted data 116. This is because the keys 115 used for encrypting the data 114 (e.g., while generating the signed and encrypted data 116) are not accessible to the verification service 134. Thus, albeit verifying the signature of the signed and encrypted data 116, the verification service 134 cannot read the data 114. This satisfies the above-described confidentiality of analysis requirement of the assurance administrator. Accordingly, the dual objective of the confidentiality of the source code requirement of the cloud customer and the confidentiality of analysis requirement of the assurance administrator are satisfied.

In an example, in addition to verifying the signature of the signed and encrypted data 116, the verification service 134 also reads the metadata 117, to ensure that the metadata satisfies one or more requirements agreed upon between the cloud customer and the assurance administrator. Note that the metadata 117 is not encrypted by the SE service 124, and hence, can be read by the verification service 134.

Merely as an example, the cloud customer and the assurance service may agree on a threshold number of lines or threshold number of words of the source code 106 that can be extracted from the tenancy 102 to the tenancy 103. If the metadata 117 indicates that the number of lines or number of words of the source code 106 within the data 114 (and hence, within the signed and encrypted data 116) exceeds the pre-agreed threshold(s), the verification service 134 blocks passage of the signed and encrypted data 116 to the tenancy 103.

In an example, upon successful verification of the signature of the signed and encrypted data 116, and upon the metadata 117 satisfying one or more requirements, the verification service 134 allows passage of the signed and encrypted data 116 to the tenancy 103. Thus, the operations of the flow diagram 400 of FIG. 4 proceeds from 428 to 432, where the verification service 134 allows passage of the signed and encrypted data 116 to the reception service 154 within the reception zone 150 of the tenancy 103. Note that the verification service 134 may, or may not, transmit the metadata 117 along with the signed and encrypted data 116 to the reception service 154.

Once the reception service 154 receives the signed and encrypted data 116, at 436 of the flow diagram 400, the reception service 154 decrypts the signed and encrypted data 116 to generate the data 114, transmits the data 114 to the detailed analysis services 158 for further analysis. For example, as both the transmission service 120 and the reception service 154 are controlled by the assurance administrator, the reception service 154 coordinates the keys with the transmission service 120. For example, the transmission service 120 sends the keys 115 to the SE service 124 for encryption, and the reception service 154 has the corresponding keys to decrypt the signed and encrypted data 116 and generate the data 114.

The detailed analysis services 158 may further analyze the data 114, e.g., to determine if the data 114 is indicative of violation of agreement between the assurance administrator and the cloud customer. Any appropriate type of analysis may be performed by the detailed analysis services 158, and appropriate actions may be taken responsive to a detection of one or more violations.

Debug Service for the SE Service

Figure 5:
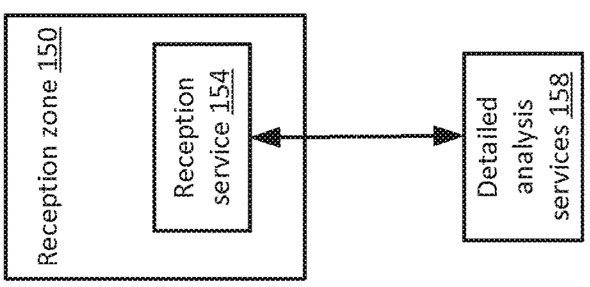
FIG. 5 illustrates a block diagram of a cloud environment comprising a debug service within an intermediate zone, wherein the debug service facilitates debugging of a signature and encryption (SE) service that is within a transmission zone.
Figure 5:
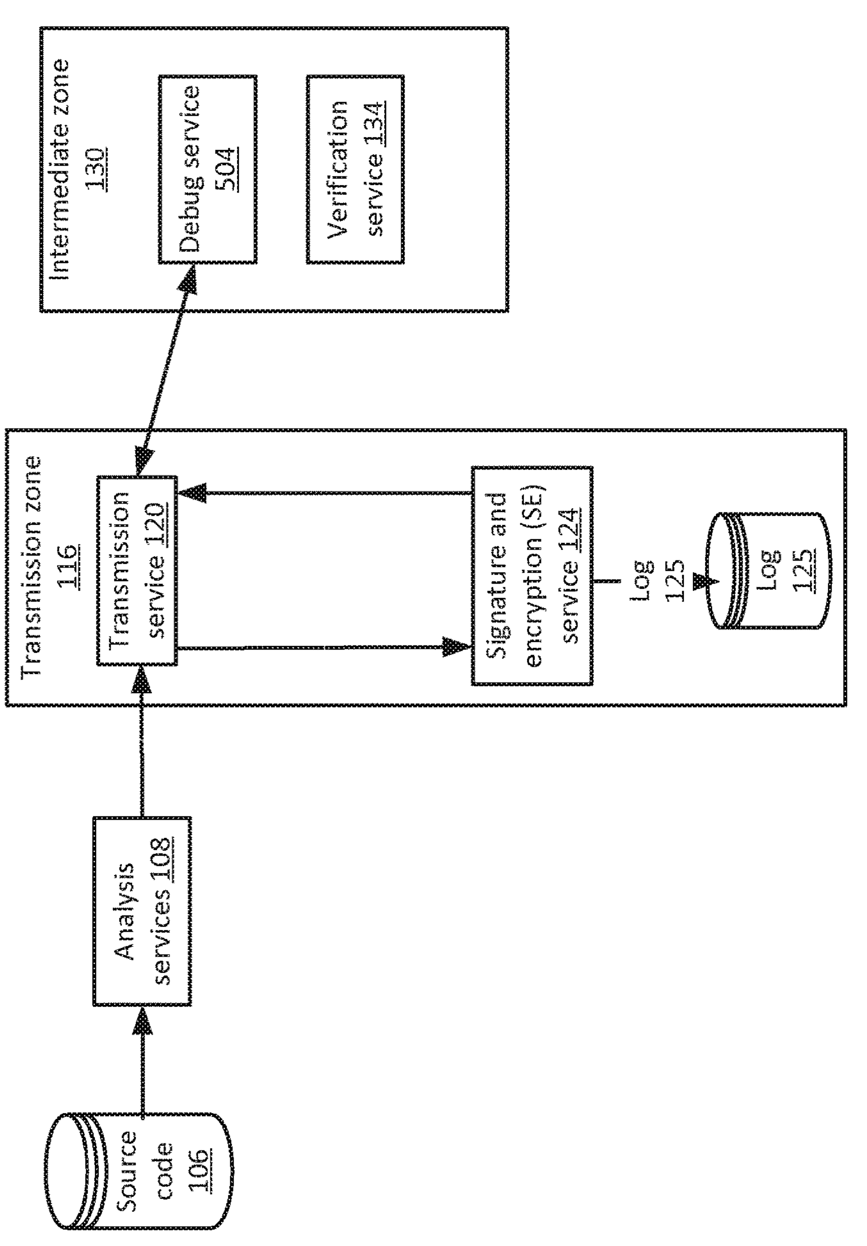

FIG. 5 illustrates a block diagram of a cloud environment 500 comprising a debug service 504 within an intermediate zone 130, wherein the debug service 504 facilitates in debugging of a signature and encryption (SE) service 124 that is within a transmission zone 116. The cloud environment 500 is at least in part similar to the cloud environments 100, 200, 300*a*, and/or 300*b* of FIGS. 1-3B. For example, similar to the cloud environments 100, 200, 300*a*, 300*b*, the cloud environment 500 also includes the one or more repositories for the source code 106, the analysis services 108, the transmission zone 116 including the transmission service 120 and the SE service 124, the intermediate zone 130 including the verification service 134, the reception zone 150 including the reception service 154, and the detailed analysis services 158. In addition, the cloud environment 500 includes the debug service 504.

Note that the tenancy boundaries are not illustrated in FIG. 5, and the tenancy boundaries in FIG. 5 may be similar to any of the tenancy boundaries illustrated for any of the cloud environments 100, 200, 300*a*, or 300*b* of FIG. 1, 2, 3A, or 3B.

In an example, the SE service 124 deployed within the transmission zone 116 may have software bugs, and in some corner cases, may not be able to successfully encrypt and/or sign the data 114. The cloud customer, in an example, may not prefer that the transmission service 120 randomly receive debug information from the SE service 124, without authorization or prior knowledge from the cloud customer. This is because the cloud customer may be apprehensive that by repeatedly and intentionally creating erroneous operation of the SE service 124 and accessing the corresponding debug information, the transmission service 120 (or the personnel of the assurance administrator) may gain insights on inner workings of the SE service 124, which may aid in reverse engineering of the SE service 124 by the personnel of the assurance administrator. As described above, the cloud customer may prefer to keep the source code and inner workings of the SE service 124 secret and obscure from the assurance administrator. Accordingly, the cloud customer may not want any arbitrary debug workflow to debug the SE service 124.

In an example, a need to debug may arise during the following example situation. Assume that the SE service 124 has flagged that the data 112 to be extracted from the tenancy 101 to the tenancy 103 has sizeable amount of the source code 106, and hence, should not be extracted to the tenancy 103. Accordingly, the SE service 124 may not sign such data 112. However, the assurance administrator disputes such findings of the SE service 124, and may not think that the data 112 includes sizeable amount of the source code 106 (e.g., an amount of source code 106 greater than a threshold amount). Such a scenario may necessitate debugging of the SE service 124. Other example scenarios necessitating a debug may also be possible.

The debug service 504 within the intermediate zone 130 facilitates in the cloud customer having some degree of control and monitoring role on debug information received by the transmission service 120 from the SE service 124. In an example, the debug service 504 may be operated and controlled by the cloud customer.

Figure 6:
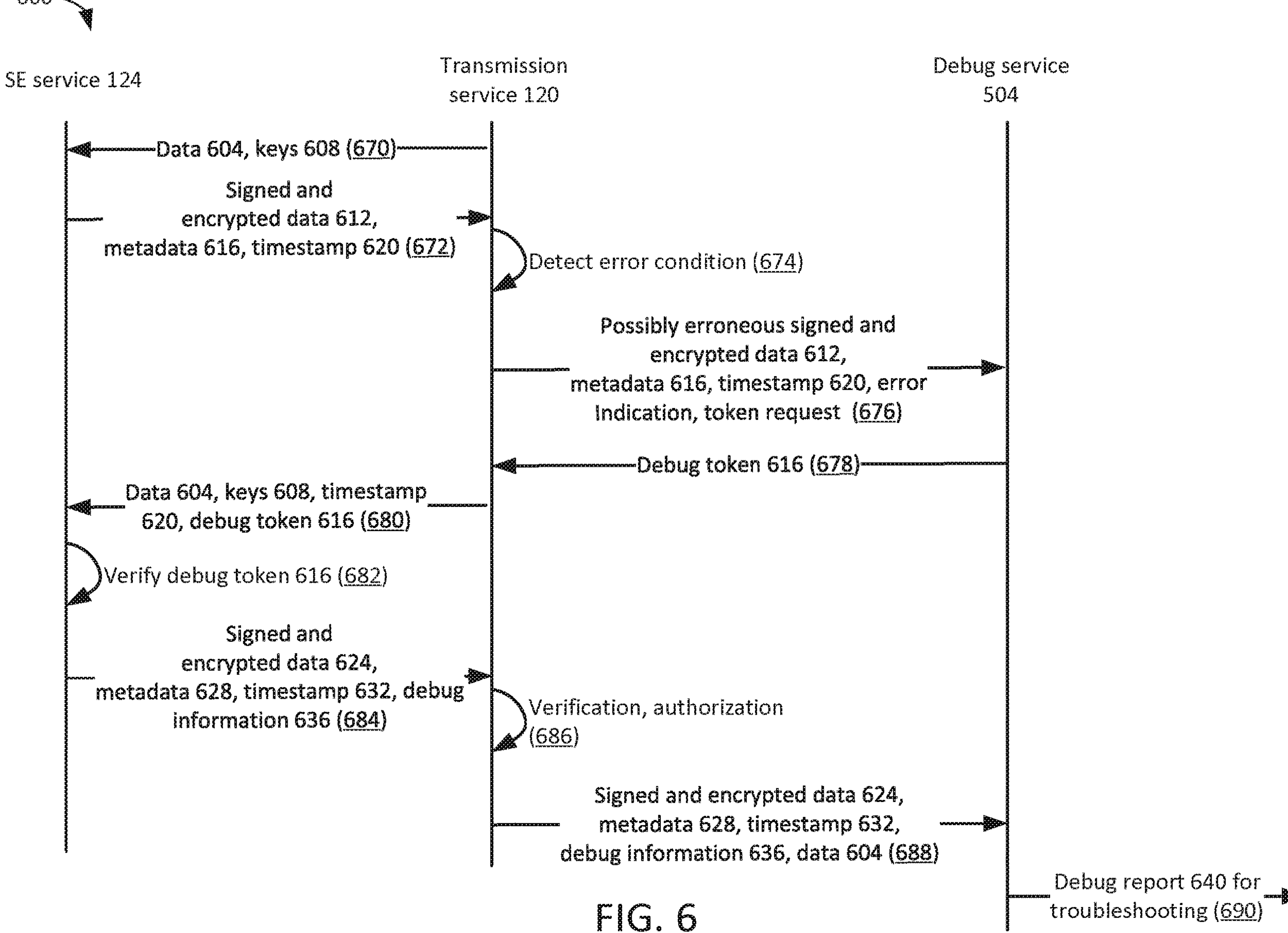
FIG. 6 illustrates a flow diagram depicting an example debug workflow for debugging a SE service within a transmission zone.

FIG. 6 illustrates a flow diagram 600 depicting an example debug workflow for debugging the SE service 124 within the transmission zone 116. The flow diagram 600 of Fig. will be described with reference to the cloud environment 500 of FIG. 5.

At 670 of FIG. 6, the transmission service 120 transmits data 604 and keys 608 to the SE service 124 for encryption and signature. At 672, the SE service 124 returns signed and encrypted data 612, associated metadata 616, and a timestamp 620, as described above with respect to the flow diagram 400 of FIG. 4.

At 674, the transmission service 120 detects an error condition associated with the signed and encrypted data 612 and/or the associated metadata 616. The transmission service 120 may detect the error condition using any appropriate manner. For example, the transmission service 120 may send the signed and encrypted data 612 and/or the associated metadata 616 to the reception service 154 (as described above with respect to FIGS. 1-4), which may decrypt the signed and encrypted data 612 and generate cleartext data. However, the decrypted cleartext data may not be as expected, such as may not match with the data 604 from which the signed and encrypted data 612 was generated. This may trigger the detection of the error condition at 674. In another example and as described above, the SE service 124 may refuse to sign data 112, based on a finding (either correct finding or erroneous finding) by the SE service 124 that the data 112 includes sizeable amount of the source code 106 (e.g., an amount of source code 106 greater than a threshold amount).

In another example, the transmission service 120 may be in a testing mode, where the transmission service 120 may test the signed and encrypted data 612 and/or the associated metadata 616, and these may not be as expected. For example, the signed and encrypted data 612 may not be a correct signed and encrypted version of the data 604. Additionally or alternatively, the information included within the metadata 612 may not truly be a reflection of the data 604 (e.g., the data 604 may have X number of lines of source codes 106, whereas the metadata 612 may indicate that the data 604 has Y number of lines of source codes 106, where X and Y are different). Based on such findings, the transmission service 120 may detect the error condition at 674.

At 676, the transmission service 120 transmits to the debug service 504 the possibly erroneous signed and encrypted data 612, possibly erroneous metadata 616, the timestamp 620, an error indication, and a request for a debug token. The error indication may provide an indication that the signed and encrypted data 612 and the metadata 616 are possibly erroneous. In an example, the error indication may also provide an indication of a suspected type of error detected at 674 (e.g., whether the error is within the signed and encrypted data 612, or within the metadata 616, or within both the signed and encrypted data 612 and the metadata 616).

At 678, the debug service 504 provides a debug token 616 to the transmission service 120, in response to receiving the information at 676. The debug token 616 will allow the transmission service 120 to receive debug report from the SE service 124 at a later stage.

At 680, the transmission service 120 transmits the data 604 (e.g., in cleartext form), the keys 608, the timestamp 620, and the debug token 616 to the SE service 124. In an example, the data 604 at 680 may be the same as the data 604 at 670, for which possibly erroneous signed and encrypted data 612 and metadata 616 were generated at 672.

At 680, the SE service 124 verifies an authenticity of the debug token 616. Upon successful verification of the debug token 616, the SE service 124 encrypts the data 604, and signs the encrypted data, to generate signed and encrypted data 624, along with metadata 628, a timestamp 632, and debug information 636, and transmits these to the transmission service 120 at 684. Note that the signed and encrypted data 624 at 684 and the signed and encrypted data 612 at 672 may have the same value and may be the same, as both of these are generated from the cleartext data 604, although these two are generated at different times. Similarly, the metadata 616 at 672 and the metadata 628 at 684 may have the same value and may be the same.

In an example, the debug information 636 may include details associated with encryption and/or signature process at the SE service 124 for the data 604, generation of the metadata 628 at the SE service 124, and/or any other relevant information that may be relied upon to debug and find possible reasons for generation of the possibly erroneous information by the SE service 124.

At 686, the transmission service 120 at 686 may optionally verify that all information provided by the SE service 124 is as expected. In an example, the debug information 636 is not encrypted by the SE service 124. Accordingly, transmission service 120 may review the debug information 636, to make sure that the debug information 636 does not include information that is of sensitive nature to the assurance administrator (such as does not include keys 608, and/or does not include any other information that the transmission service 120 had earlier provided to the SE service 124 and does not want to provide to the intermediate zone 130). In an example, the transmission service 120 may seek authorization from one or more assurance administrator personnel, e.g., to transmit the debug information 636 to the intermediate zone 130 controlled by the cloud customer.

Upon successful verification and/or authorization, at 688 the transmission service 120 transmits the signed and encrypted data 624, the metadata 628, the timestamp 632, the debug information 636, and/or the cleartext data 604 to the debug service 504. In an example, the cleartext data 604 may be dummy data (or relatively non-critical data), e.g., to avoid revealing to the debug service 04 the actual analysis information that the analysis services 108 has gathered from the source code 106.

At 690, the debug service 504 generates a debug report 640 for troubleshooting the SE service 124. The debug report 640 may include some or all the information received by the debug service 504 at 688 from the transmission service 120. A cloud customer personnel may review the debug report 640, e.g., to use the debug report 640 for debugging the SE service 124.

As described above, the debug information 636 is output by the SE service 124 at 684, only after reception and verification of the debug token 616. Thus, the transmission service 120 cannot randomly request and receive the debug information from the SE service 124. Rather, the transmission service 120 has to obtain authorization from the intermediate zone 130 controlled by the cloud customer (such as from the debug service 504) in the form of the debug token, in order to receive the debug information from the SE service 124. This limits a number of times debug information can be obtained by the transmission service 120 from the SE service 124.

Thus, the debug service 504 within the intermediate zone 130 facilitates in the cloud customer having some degree of monitoring and control on the debug information received by the transmission service 120 from the SE service 124. Each time the transmission service 120 wants to query the SE service 124 for the debug information, the transmission service 120 has to receive authorization for the same from the debug service 504 in the form of a debug token, which can be generated by the debug service 504 and not by the transmission service 120.

Methodologies

Figure 7:
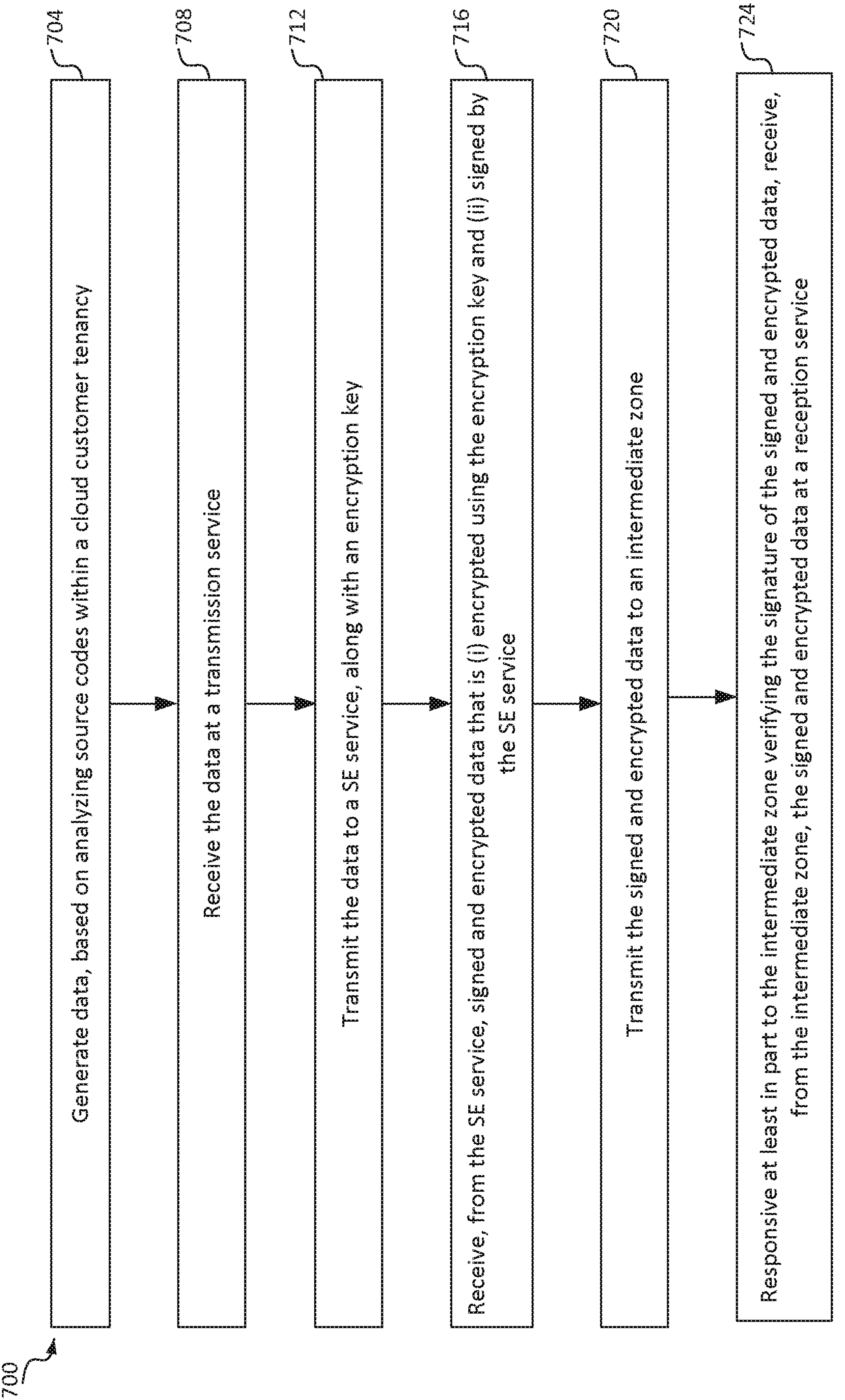
FIG. 7 is a flow diagram depicting a method for transmitting data between tenancies in a mutually distrustful environment.

FIG. 7 is a flow diagram depicting a method 700 for transmitting data between tenancies in a mutually distrustful environment. The method 700 may be executed within any of the cloud environments described above, such as any of the cloud environments 100, 200, 300*a*, 300*b*, or 500 described above.

The method 700 includes, at 704, generating data, based on analyzing source codes within a cloud customer tenancy. For example, the analysis services 108 generates data 112, based on analyzing source codes 106 within a cloud customer tenancy 101. At 708, the data is received at a transmission service (such as the transmission service 120, form the analysis services 108).

At 712, the transmission service transmits the data to a SE service, along with an encryption key. In an example, a cleartext form of the data is transmitted to the SE service 124, along with one or more keys 115.

At 716, the transmission service receives, from the SE service, signed and encrypted data that is (i) encrypted using the encryption key and (ii) signed by the SE service. In an example, along with the signed and encrypted data 116, metadata 117 defining one or more attributes of the data is also received. In an example, the SE service 124 maintains a log 125 of the data.

At 720, the transmission service transmits the signed and encrypted data to an intermediate zone. For example, the transmission service 120 transmits the signed and encrypted data 116 (e.g., along with the metadata 117) to the verification service 134 of the intermediate zone 130. In an example, the signed and encrypted data 116 is transmitted to the verification service 134, to facilitate the verification service 134 to verify a signature of the signed and encrypted data 116, and allow passage of the signed and encrypted data 116 to the reception service upon successful verification of the signature.

At 724, responsive at least in part to the intermediate zone (such as the verification service) verifying the signature of the signed and encrypted data, the signed and encrypted data is received from the intermediate zone and at a reception service (such as the reception service 154 within the reception zone 150). The received data may be analyzed by the detailed analysis services 158, as described above.

Figure 8:
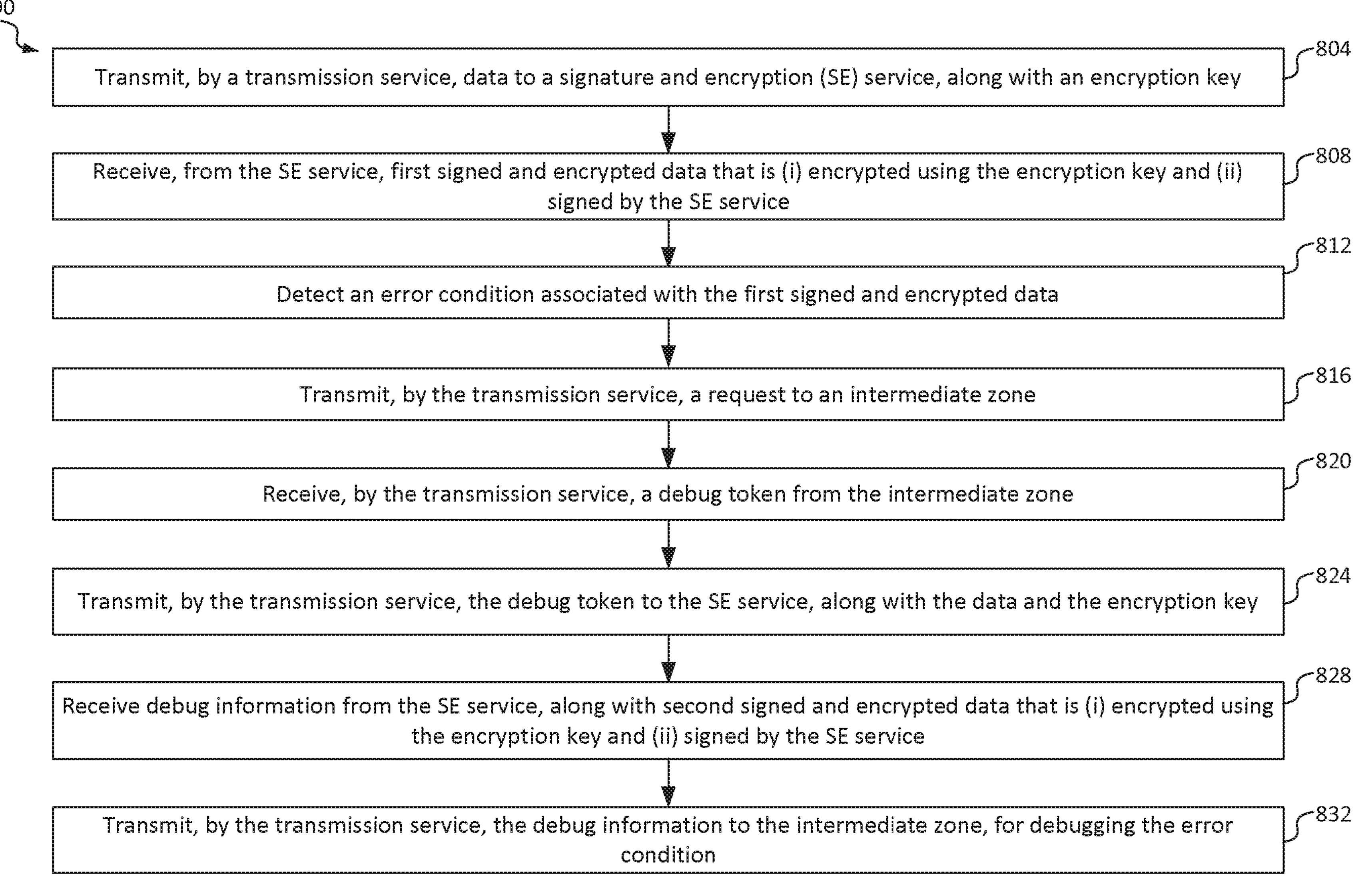
FIG. 8 is a flow diagram depicting a method for debugging a SE service that is within a transmission zone of a cloud environment.

FIG. 8 is a flow diagram depicting a method 800 for debugging a SE service that is within a transmission zone of a cloud environment. The method 800 may be executed within any of the cloud environments described above, such as the cloud environment 500 described above.

At 804, a transmission service transmits data to a SE service, along with an encryption key. At 808, the transmission service receives, from the SE service, first signed and encrypted data that is (i) encrypted using the encryption key and (ii) signed by the SE service.

At 812, the transmission service detects an error condition associated with the first signed and encrypted data. The transmission service 120 may detect the error condition using any appropriate manner, as described above in detail.

At 816, the transmission service transmits a request (such as a debug token request) to an intermediate zone, such as the debug service 504 of the intermediate zone 130. In an example, the request is accompanied by the possibly erroneous first signed and encrypted data. At 820, the transmission service receives a debug token from the intermediate zone. At 824, the transmission service transmits the debug token to the SE service, along with the data and the encryption key.

At 828, the transmission service receives debug information from the SE service, along with second signed and encrypted data that is (i) encrypted using the encryption key and (ii) signed by the SE service. In an example, the first signed and encrypted data and the second signed and encrypted data may be the same, as both are generated based on the same data. Accordingly, the error condition is also likely to be associated with the second signed and encrypted data.

At 832, the transmission service transmits the debug information to the intermediate zone (such as to the debug service 504), for debugging the error condition. In an example, along with the debug information, the transmission service also transmits the second signed and encrypted data, and may optionally transmit the unencrypted data, e.g., to enable the debug service to debug the SE service 124.

Figure 9:
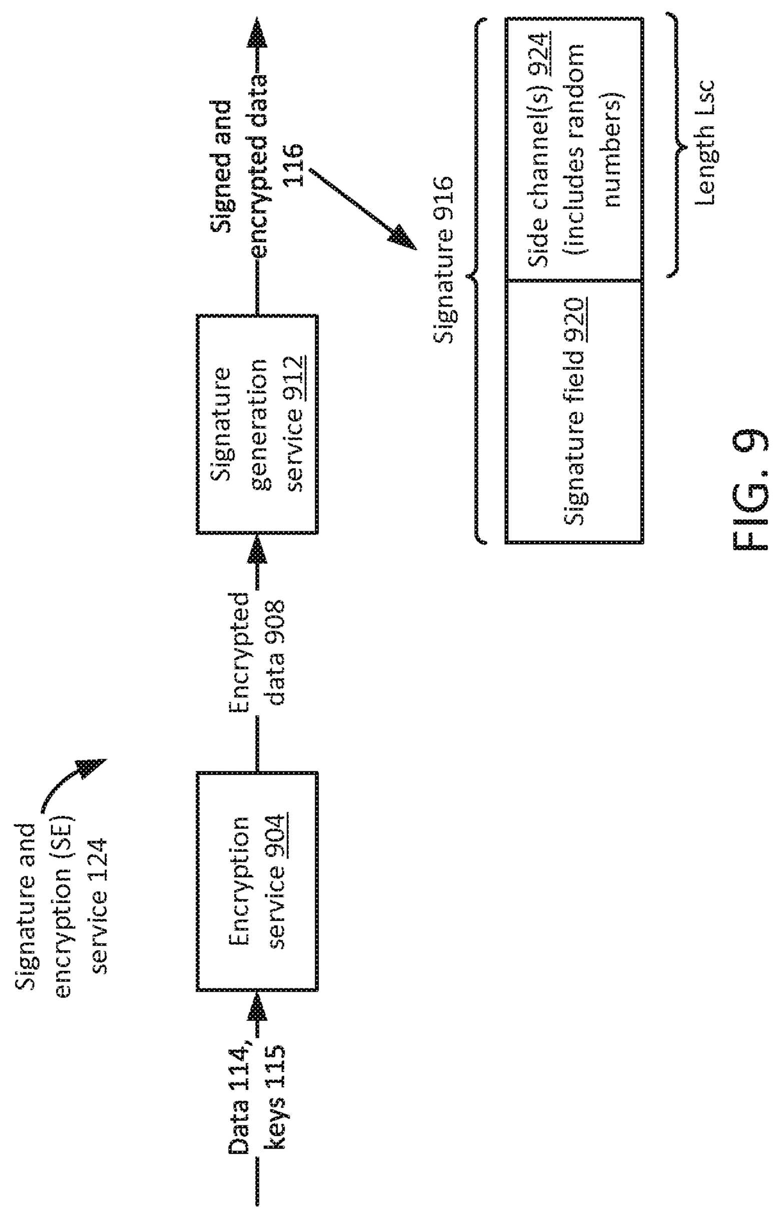
FIG. 9 illustrates an operation of an SE service, and further illustrates one or more side channels within a signature of a signed and encrypted data generated by the SE service, where the side channels supposedly include one or more random numbers.

Possibility of Sensitive Information (Such as Encryption Key) Leakage Through Signature FIG. 9 illustrates an operation of the above-described SE service 124, and further illustrates one or more side channels 924 within a signature of the signed and encrypted data 116 generated by the SE service 124, where the side channels 924 supposedly include one or more random numbers. For example, as illustrated in FIG. 9, the SE service 124 receives the data 114 in the cleartext form, along with one or more encryption keys 115. The SE service 124 includes an encryption service 904 that performs an encryption operation on the data 114 using the one or more encryption keys 115, to generate encrypted data 908.

The SE service 124 also executes a signature generation service 912 that performs a signature operation on the encrypted data 908, to generate the signed and encrypted data 116. FIG. 9 also schematically illustrates a signature 916 of the signed and encrypted data 116. The signature generation service 912 may use any appropriate type of algorithm or cryptography techniques for generation of the signature 916. An example cryptography technique for generation of the signature 916 is AES-CMAC (Advanced Encryption Standard-Cipher-based Message Authentication Code), although other cryptography techniques may be used.

As illustrated in FIG. 9, the signature 916 includes (i) a signature field 920 including verifiable contents of the signature 916 (e.g., which may be verified later by the verification service 134) and (ii) one or more side channels 924 that supposedly include random numbers. In an example, the random numbers within the side channels 924 may be used to obfuscate the signature field 920, such that a malicious component may not be able to distinguish between the signature field 920 and the random numbers (e.g., without knowing a-priori which bits of the signature 916 represent the signature field 920 and which bits of the signature 916 represent the side channels 924). In an example, the random numbers are generated by a random number generator within the signature generation service 912 used for generating the signature 916, and appended to the signature field 920.

Although the side channels 916 are illustrated in FIG. 9 to be next to the signature field 920, in some examples, bits of the side channels 916 and the signature field 920 may be intermingled, e.g., to confuse a malicious component from specifically identifying the signature field 920.

As described above, there may be a mutual distrust between the assurance administrator and the cloud customer. For example, the SE service 124 is developed by the cloud customer, whereas the transmission service 120 of the assurance administrator transmits the data 114 and the keys 115 to the SE service 124 and receives the signed and encrypted data 116 from the SE service 124. In an example, the assurance administrator may be apprehensive that the SE service 124 (which is developed by the cloud customer) may leak sensitive information, e.g., by posing the sensitive information as the supposedly random numbers of the side channels 924. For example, the assurance administrator may be apprehensive that the signature generation service 912 may include, instead of the random numbers, sensitive information within the side channels 924.

Note that the signature 916 itself is not encrypted by the keys 115, and is visible to and readable by the verification service 134. Accordingly, arguably, if the signature generation service 912 includes sensitive information within the side channels 924, such sensitive information may be read by the verification service 134. Thus, such sensitive information may then be accessed by the cloud customer, thereby at least in part defeating the confidentiality of analysis objective of the assurance administrator.

As illustrated in FIG. 9, a length of the side channel 924 (or the sum of lengths of the side channels 924) is denoted by length Lsc. The length Lsc of the side channels 924 may not be long enough to include the cleartext data 114 within the side channels 924. For example, the side channels 924 may be a few bytes long (such as 8 bytes, or 16 bytes, or 32 bytes, or 64 bytes, for example, and is implementation specific). In contrast, the size of the cleartext data 114 may be in the kilobytes or megabytes range. At the very least, the size of the cleartext data 114 may be significantly greater than the length Lsc of the side channels 924. Accordingly, possibility of the signature generation service 912 using the side channels 924 to leak the cleartext data 114 may be relatively low.

However, the keys 115 used for encrypting the data 114 may be comparable in length to the length Lsc of the side channels 924. Accordingly, it may be possible that the signature generation service 912 of the SE service 124 tries to leak the keys 115 using the side channels 924, e.g., by including at least portions of the keys 115 within the side channels 924. The verification service 134, when verifying the signature 916, may read the side channels 924, and may have access to the keys 115. Using the keys 115, the verification service 134 can now decrypt the signed and encrypted data 116, thereby accessing the data 114, and thereby defeating the above-described confidentiality of analysis objective of the assurance administrator. Accordingly, techniques are described below to prevent or at least reduce possibility of leakage of sensitive information through the side channels 924 of the signature 916.

Figure 10:
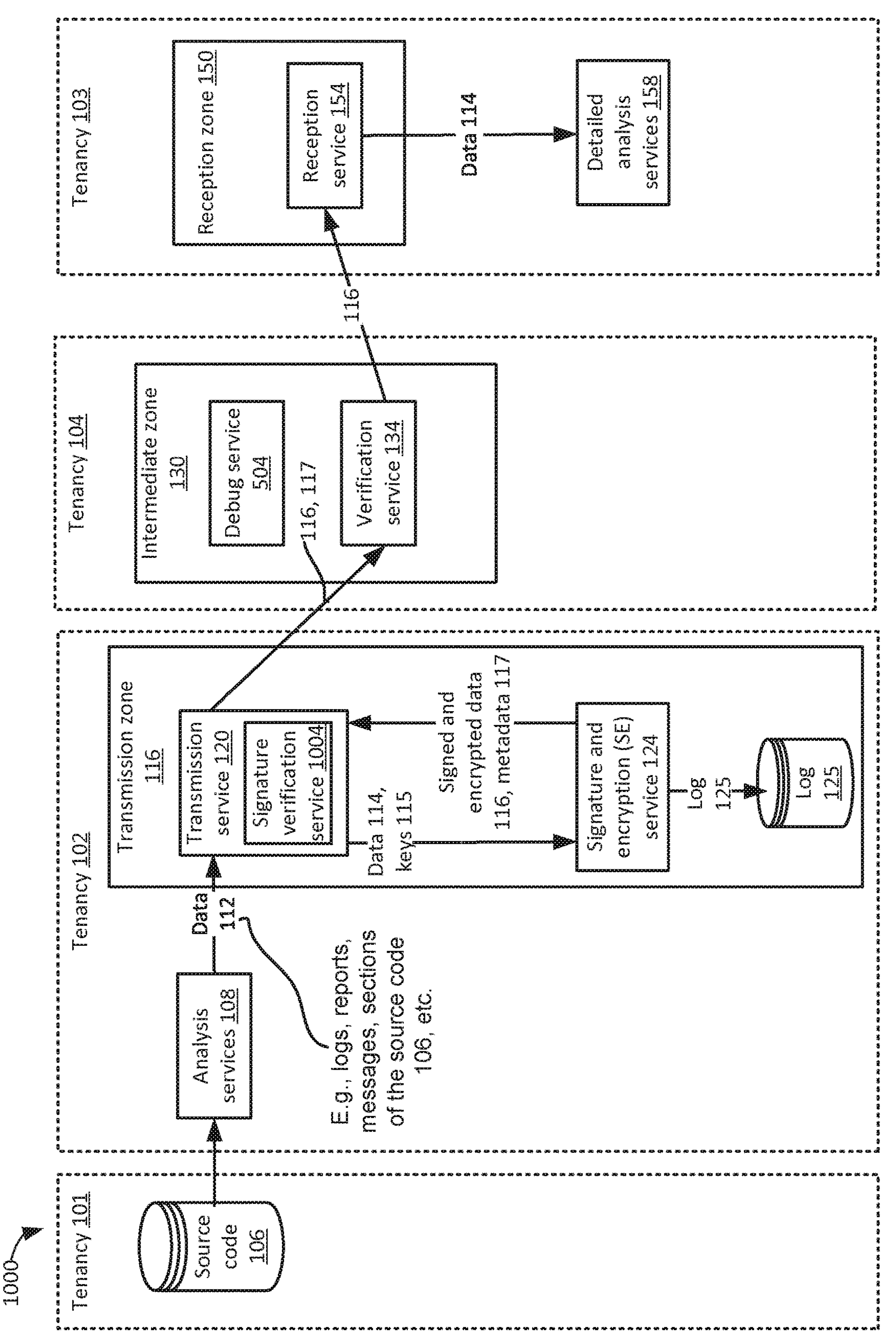
FIG. 10 illustrates a cloud environment including a signature verification service within a transmission service of a transmission zone.

Side Channel Monitoring to Prevent Sensitive Information Leakage Through Signature FIG. 10 illustrates a cloud environment 1000 including a signature verification service 1004 within a transmission service 120 of a transmission zone 116. The cloud environment 1000 is at least in part similar to the cloud environments 100, 200, 300*a*, 300*b*, 500 described above, and the above description associated with the cloud environments 100, 200, 300*a*, 300*b*, 500 also applies to the cloud environment 1000 of FIG. 10, unless contradictory in nature.

Furthermore, a distribution of various components within various tenancies of the cloud environment 1000 of the example of FIG. 10 is similar to that illustrated in FIG. 1. However, in some other examples, the components of the cloud environment 1000 may be distributed among various tenancies in accordance with any of the cloud environments 200, 300*a*, or 300*b*, or a variation thereof.

In an example, in addition to the various components described above with respect to the cloud environments 100, 200, 300*a*, 300*b*, and/or 500, the cloud environment 1000 includes the signature verification service 1004 within the transmission service 120 of the transmission zone 116. Referring to FIGS. 9 and 10, when the transmission service 120 receives the signed and encrypted data 116 and metadata 117 from the SE service 124, the signature verification service 1004 verifies that the signature 916 of the signed and encrypted data 116 is not used to extract any sensitive data from the SE service 124 to the verification service 134. For example, as described above, the signature generation service 912 within the SE service 124 (see FIG. 9) may pose sensitive data as the random numbers within the one or more side channels 924 of the signature 916. In an example, the signature verification service 1004 monitors the side channels 924 of the signature 916, to ensure that the keys 115 and/or any other sensitive information are not extracted through the side channels 924.

Note that the side channels 924 are supposed to include (or "supposedly" include) random numbers, the signature verification service 1004 monitors the side channels 924 of the signature 916, to verify that the sensitive information is not posed as the random numbers of the side channels 924 and leaked through the side channels 924.

For example, the signature verification service 1004 may compare the supposedly random numbers within the side channels 924 with the keys 115, to ensure that the keys 115 are not leaked or extracted out of the transmission zone 116 through the side channels 924.

In an example, the assurance administrator and the cloud customer may have a mutual agreement on a format of the signature 916. For example, the assurance administrator and the cloud customer may have a mutual agreement on a maximum length of the side channels 924. If there are more than one side channels 924, the agreement may be regarding a maximum length of a sum of lengths of all the side channels 924. For example, the length of the side channel 924 (or the sum of lengths of the side channels 924) cannot exceed a threshold length.

For example, as illustrated in FIG. 9, the length of the side channel 924 (or the sum of lengths of the side channels 924) is Lsc, and length Lsc cannot exceed a threshold length Lth. That is, the signature generation service 912 is supposed to maintain the following condition:

$$Lsc \leq Lth. \qquad \text{Equation 1}$$

In an example, the threshold length Lth is less than a length of each of the one or more keys 115 used for encrypting the data 114. For example, each of the one or more keys 115 may have a length of 16 bytes, or 32 bytes, and may be implementation specific. The threshold length Lth has to be less than this length. Accordingly, because Lsc≤Lth, the length Lsc is supposed to be less than a length of each of the one or more keys 115 used for encrypting the data 114.

Because the length Lsc of the side channels 924 is supposed to be less than the length of each of the one or more keys 115, a key 115 cannot be extracted by posing as random numbers within the side channels 924.

In an example, the length Lsc of the side channels 924 may be constrained (e.g., as described above with respect to equation 1) by selecting an appropriate cryptographic technique for generating the signature 916, and/or by configuring the cryptographic technique to tune the length of the signature 916 and/or the length Lsc of the side channels 924.

In an example, an integrity algorithm used to generate the signature 916 may comprise or be classed as a pseudorandom function (PRF). In an example, using such a class of signature generation algorithm may allow truncation of the side channels 924 to a desired length Lsc, such that equation 1 described above is satisfied. In an example, a message authentication code (MAC) may be used to generate the signature 916, where the MAC is generated from an associated message (such as the encrypted data 908), e.g., for assuring an integrity of the message and an authenticity of a source of the message. Examples of MAC that may be used include one or more of Keyed-Hash Message Authentication Code (HMAC), KECCAK Message Authentication Code (KMAC), Cipher-based message authentication code (CMAC), although any other type of integrity algorithm for generation of the signature 916 may be used (as long as the algorithm may be configured to restrict the length of the side channels of the signature, as described above). In an example, a truncated integrity check (such as a truncated MAC) may be used, where the side channels are truncated in accordance with the equation 1 described above. For example, the length Lsc of the side channels 924 may be measured in bits (e.g., instead of bytes), and the length Lsc may be as small as 1 bit. In such a scenario, a forged message may have a 50% chance of being accepted, and a 50% chance of being detected and revealing the attempted extraction. In an example, making the length Lsc of the side channels 924 too small may enable a malicious actor to correctly guess a valid signature field (such as the signature field 920, see FIG. 9), and making the length Lsc relatively longer may aid in this aspect. On the other hand, making the length Lsc too long may facilitate in extraction of the keys. Thus, an optimal or near optimal length Lsc may be chosen, such that the length Lsc satisfies equation 1 described above.

In an example, when the transmission service 120 receives the signed and encrypted data 116 and metadata 117 from the SE service 124, the signature verification service 1004 verifies that the length Lsc of the side channels 924 of the signature 916 of the signed and encrypted data 116 satisfies the condition specified in equation 1. For example, the signature verification service 1004 verifies that the length Lsc of the side channels 924 has not exceeded the pre-agreed threshold length Lth. As described above, the threshold length Lth may be based on a length of the one or more keys 115.

Figure 11:
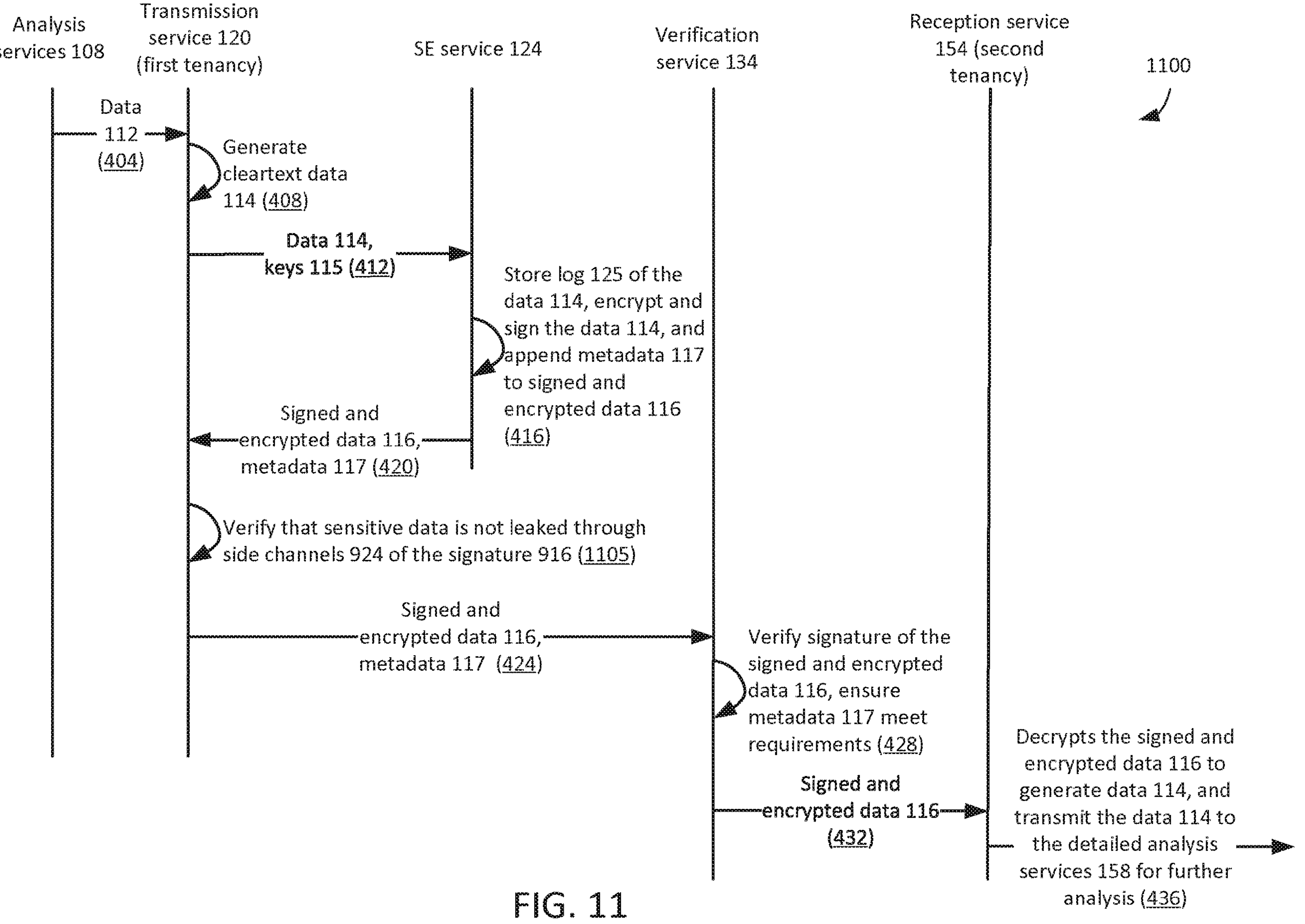
FIG. 11 illustrates a flow diagram depicting an example extraction of data from a transmission zone of a first tenancy to a reception zone of a second tenancy via an intermediate zone, wherein a signature verification service within the transmission zone verifies that sensitive data is not leaked through side channels of a signature of a signed and encrypted data being extracted.

FIG. 11 illustrates a flow diagram 1100 depicting an example extraction of data 112 from a transmission zone 120 of a first tenancy to a reception zone 150 of a second tenancy via an intermediate zone 130, wherein a signature verification service 1004 verifies that sensitive data is not leaked through side channels 924 of a signature 916 of a signed and encrypted data 116 being extracted.

The flow diagram 1100 of FIG. 11 is at least in part similar to the flow diagram 400 of FIG. 4, and description of the flow diagram 400 of FIG. 4 also applies to the flow diagram 1100 of FIG. 11, unless contradictory in nature. Similar operations in FIGS. 4 and 11 are labelled using the same labels.

In addition to the operations described above with respect to the flow diagram 400 of FIG. 4, the flow diagram 1100 of FIG. 11 includes an operation at 1105, which is executed by the signature verification service 1004 of the transmission service 120. The operation 1105 is performed subsequent to the operation 420, when the transmission service 120 receives the signed and encrypted data 116 and metadata 117 from the SE service 124.

At 1105, the signature verification service 1004 of the transmission service 120 verifies that sensitive data is not leaked through side channels 924 of the signature 916. For example, the signature verification service 1004 may read the random numbers of the side channels 924, to ensure that the random numbers of the side channels 924 do not match with the one or more keys 115. For example, the signature verification service 1004 may deterministically validate the signed and encrypted data 116, to ensure that the keys 115 are not hidden within the signed and encrypted data 116.

In an example, most portion of the signed and encrypted data 116 (such as the signature field 920) may be deterministically validated (e.g., ensuring that they include the signature bits as expected). Portions of the signed and encrypted data 116, which may not be deterministically validated, may be random numbers of the side channels 924. Accordingly, in an example, the signature verification service 1004 may determine a length Lsc of the portions of the signed and encrypted data 116 that may not be deterministically validated. Put differently, the signature verification service 1004 may determine a length Lsc of the side channels 924.

In an example, the signature verification service 1004 ensures that the length Lsc does not exceed the pre-agreed threshold length Lth, as described above with respect to equation 1. Accordingly, because the length Lsc of the side channels 924 does not exceed the pre-agreed threshold length Lth, a key 115 cannot be leaked through the side channels 924, as also described above with respect to equation 1.

The remaining operations of the flow diagram 1100 of FIG. 11 will be apparent based on the description of corresponding operations of the flow diagram 400 of FIG. 4, and hence, these operations are not described again here.

Ephemerality of the SE Service 124

Continuing with the above description with respect to FIGS. 9-11, the threshold length Lth for the side channels 924 is selected such that the threshold length Lth is less than a length of each of the one or more keys 115 used for encrypting the data 114. This ensures that the keys 115 may not be leaked through a signature 924, as the length Lsc of the side channels 924 of the signature 924 cannot exceed the threshold length Lth (where the signature verification service 1004 ensures that the length Lsc does not exceed the threshold length Lth).

However, this still leaves a possibility that a key 115 can be leaked over a plurality of signatures. FIG. 12 illustrates a stream of signed and encrypted data **116*a*, 116*b*, . . . , 116N transmitted by the transmission service 120 to the reception service 154 through the intermediate zone 130. Each such signed and encrypted data 116 has corresponding one or more side channels 924. For example, the signed and encrypted data 116*a* has one or more side channels 924*a*, the signed and encrypted data 116*b* has one or more side channels 924*b*, the signed and encrypted data 116N has one or more side channels 924N, and so on. Each of these side channels 924*a*, 924*b*, 924N has a length Lsc. Thus, a combination of the lengths Lsc of the side channels 924*a*, 924*b*, 924**N is N*Lsc, where N is assumed to be an integer representing a number of signed and encrypted data within the stream of signed and encrypted data **116*a*, . . . , 116**N.

Thus, due to the operation 1105 of FIG. 11 and ensuring satisfaction of equation 1 described above, the side channels of a single instance of signed and encrypted data 116 may not be long enough to leak a key 115 to the intermediate zone 130. However, the assurance administrator may be apprehensive that the SE service 124 may attempt to use a combined length of a plurality of such side channels (such as two or more of the side channels **124*a*, . . . , 124N) of a corresponding plurality of instances of the signed and encrypted data to leak a key 115. For example, a first subset of a key 115 may be leaked as supposedly random numbers of the side channels 124*a*, and a second subset of the key 115 may be leaked as supposedly random numbers of the side channels 124*b*, such that the entire key 115** is leaked over two different side channels associated with two different instances of the signed and encrypted data.

In an example, to ensure that sensitive information is not leaked over side channels **124*a*, . . . 124N of a series of signed and encrypted data 116*a*, . . . , 116N, the SE service 124 is designed to be ephemeral in nature. For example, the SE service 124, due to its ephemeral nature, cannot preserve its state between two consecutive encryption and signature operations. For example, assume that the SE service 124 has a first state during generating of the signed and encrypted data 116*a*. The first state is expunged or forgotten by the SE service 124, after the generation of the signed and encrypted data 116*a*. Accordingly, when generating the signed and encrypted data 116*b* (wherein the SE service 124 consecutively generates the signed and encrypted data 116*a*, 116*b*), the SE service 124 does not preserve the first state or has access to the first state. The SE service 124 forgets a state of the SE service 124, after generation of an instance of the signed and encrypted data 116**.

Referring again to FIG. 12, assume that a key 115 has a first subset and a second subset, which in combination defines an entirely of the key 115. Also assume that each of the first subset and a second subset has a length that is less than the threshold length Lth, and also less than the length Lsc of the side channels 924 of a single instance of the signed and encrypted data. Now, also assume that the SE service 124 includes the first subset of the key 115 within the side channels 924*a* of a first signed and encrypted data 116*a*. But when generating a subsequent second signed and encrypted data 116*a*, due to its ephemeral nature, the SE service 124 has forgotten that the first subset of the key 115 was within the side channels 924*a* of the signed and encrypted data 116*a*. Accordingly, the SE service 124 would not know whether to include the first subset or the second subset of the key 115 within the side channels 924*b* of the second signed and encrypted data 116*b*. Accordingly, due to its ephemeral nature, the SE service 124 cannot use two or more of the series of side channels 924*a*, . . . , 924N for transmitting one or more keys.

Figure 13:
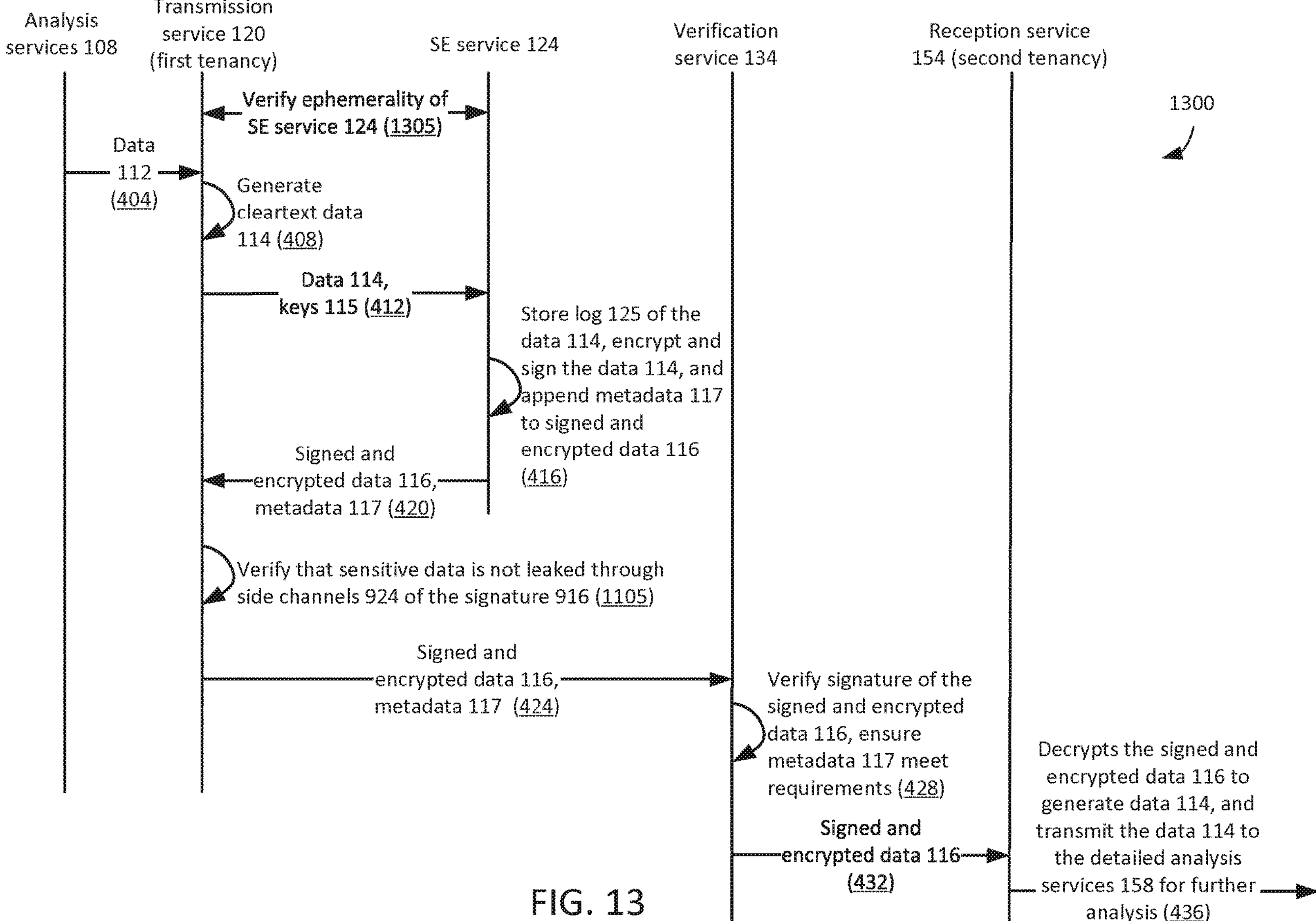
FIG. 13 illustrates a flow diagram depicting an example extraction of data from a transmission zone of a first tenancy to a reception zone of a second tenancy via an intermediate zone, wherein a SE service for generating a stream of signed and encrypted data is ephemeral in nature.

FIG. 13 illustrates a flow diagram 1300 depicting an example extraction of data 112 from a transmission zone 120 of a first tenancy to a reception zone 150 of a second tenancy via an intermediate zone 130, wherein a SE service 124 for generating a stream of signed and encrypted data is ephemeral.

The flow diagram 1300 of FIG. 13 is at least in part similar to the flow diagram 1100 of FIG. 11, and description of the flow diagram 1100 of FIG. 11 also applies to the flow diagram 1300 of FIG. 13, unless contradictory in nature. Similar operations in FIGS. 11 and 13 are labelled using the same labels.

In addition to the operations described above with respect to the flow diagram 1100 of FIG. 13, the flow diagram 1300 of FIG. 13 includes an operation 1305, which is performed by a component controlled by the assurance administrator. In the example of FIG. 13, it is assumed that the operation 1305 is performed by the transmission service 120 controlled by the assurance administrator. However, the operation 1305 may be performed by another component controlled by the assurance administrator.

For example, at 1305, the transmission service 120 (or another component controlled by the assurance administrator) verifies that the SE service 124 is ephemeral in nature. An example manner to achieve ephemerality is to reset the SE service 124 (e.g., by restoring a virtual machine of the SE service 124 to an original snapshot), or terminate the SE service 124 after each signature and encryption operation and restart the SE service prior to a subsequent signature and encryption operation. The verification of the ephemerality of the SE service 124 can be performed using any appropriate techniques. For example, personnel of the assurance administrator may perform testing on the SE service 124, to verify its ephemerality. In another example, personnel of the assurance administrator may interact with personnel of the cloud administrator, to discuss design of the SE service 124 and ensure its ephemerality. In yet another example, the signature verification service 1004 may review side channels of a plurality of consecutive instances of the signed and encrypted data, to verify ephemerality of the SE service 124 and to ensure that keys are not leaked over the series of side channels.

In an example, the operation 1305 of FIG. 13 may be performed each time the SE service 124 is updated or newly installed. In another example, the operation 1305 of FIG. 13 may be performed periodically or intermittently.

The remaining operations of the flow diagram 1300 of FIG. 13 will be apparent based on the description of corresponding operations of the flow diagram 400 of FIG. 4, and hence, these operations are not described again here.

Methodologies

Figure 14:
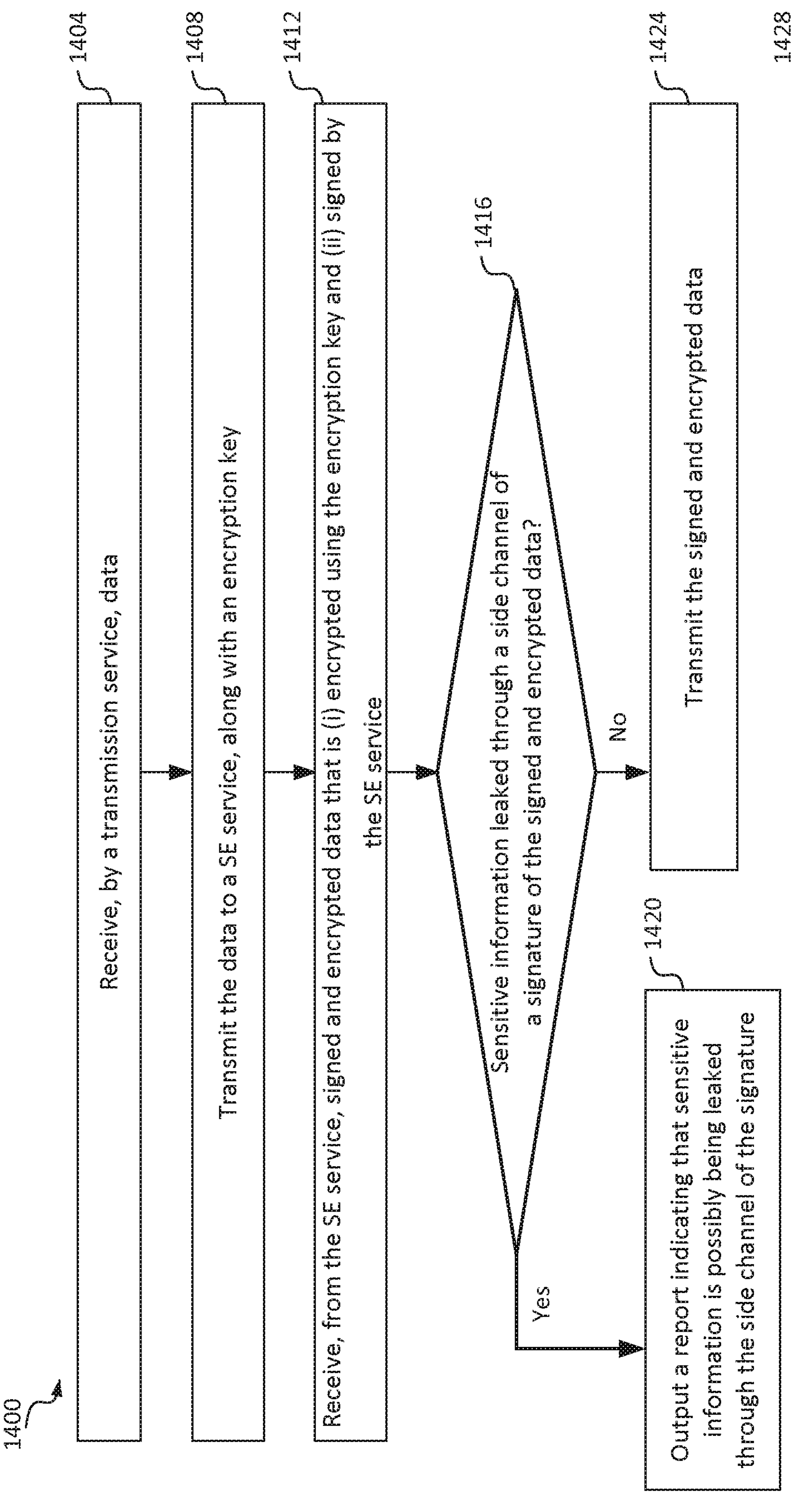
FIG. 14 is a flow diagram depicting a method for preventing or at least reducing possibilities of leakage of sensitive information through a signature of signed and encrypted data generated by an SE service.

FIG. 14 is a flow diagram depicting a method 1400 for preventing or at least reducing possibilities of leakage of sensitive information through a signature of signed and encrypted data generated by an SE service. The method 1400 may be executed within any of the cloud environments described above (e.g., the cloud environment 1000 of FIG. 10).

At 1404 of the method 1400, a transmission service receives data. For example, the transmission service 120 may receive data 112 generated by the analysis service 108. The received data may already be in cleartext form, or a cleartext form 114 of the data 112 may be generated by the transmission service.

At 1408, the transmission service transmits the data to a SE service, along with an encryption key, as described above in detail. At 1412, the transmission service receives, from the SE service, signed and encrypted data that is (i) encrypted using the encryption key and (ii) signed by the SE service, as also described above in detail.

At 1416, a determination is made as to whether sensitive information is being leaked through a side channel of a signature of the signed and encrypted data. For example, the signature verification service 1004 may read the random numbers of the side channels 924, to ensure that the random numbers of the side channels 924 do not match with the one or more keys 115. In another example, the signature verification service 1004 may determine a length Lsc of portions of the signed and encrypted data 116 that may not be deterministically validated. Thus, the signature verification service 1004 may determine a length Lsc of the side channels 924. In an example, the signature verification service 1004 ensures that the length Lsc does not exceed the pre-agreed threshold length Lth, as described above with respect to equation 1. Accordingly, because the length Lsc of the side channels 924 does not exceed the pre-agreed threshold length Lth, a key 115 cannot be leaked through the side channels 924, as also described above with respect to equation 1.

If "Yes" at 1416 (e.g., if the random numbers of the side channels 924 at least in part match with an encryption key 115, and/or if the length Lsc of the side channels 924 exceeds the pre-agreed threshold length Lth), the method 1400 proceeds to 1420, wherein the signature verification service 1004 outputs a report indicating that sensitive information is possibly being leaked through the side channel of the signature. Accordingly, the transmission service 120 may not allow passage of the signed and encrypted data to the reception service 154 through the intermediate zone 130. The personnel of the assurance administrator can take appropriate steps in response to such a report (e.g., may discuss the issue with the cloud customer, or escalate the issue to a government regulatory agency).

If "No" at 1416 (e.g., if the random numbers of the side channels 924 does not match with an encryption key 115, and if the length Lsc of the side channels 924 does not exceed the pre-agreed threshold length Lth), the method 1400 proceeds to 1424, wherein the transmission service 120 transmit the signed and encrypted data to the reception service 154 through the intermediate zone 130, as also described above in further detail.

Computer System Architecture

Figure 15:
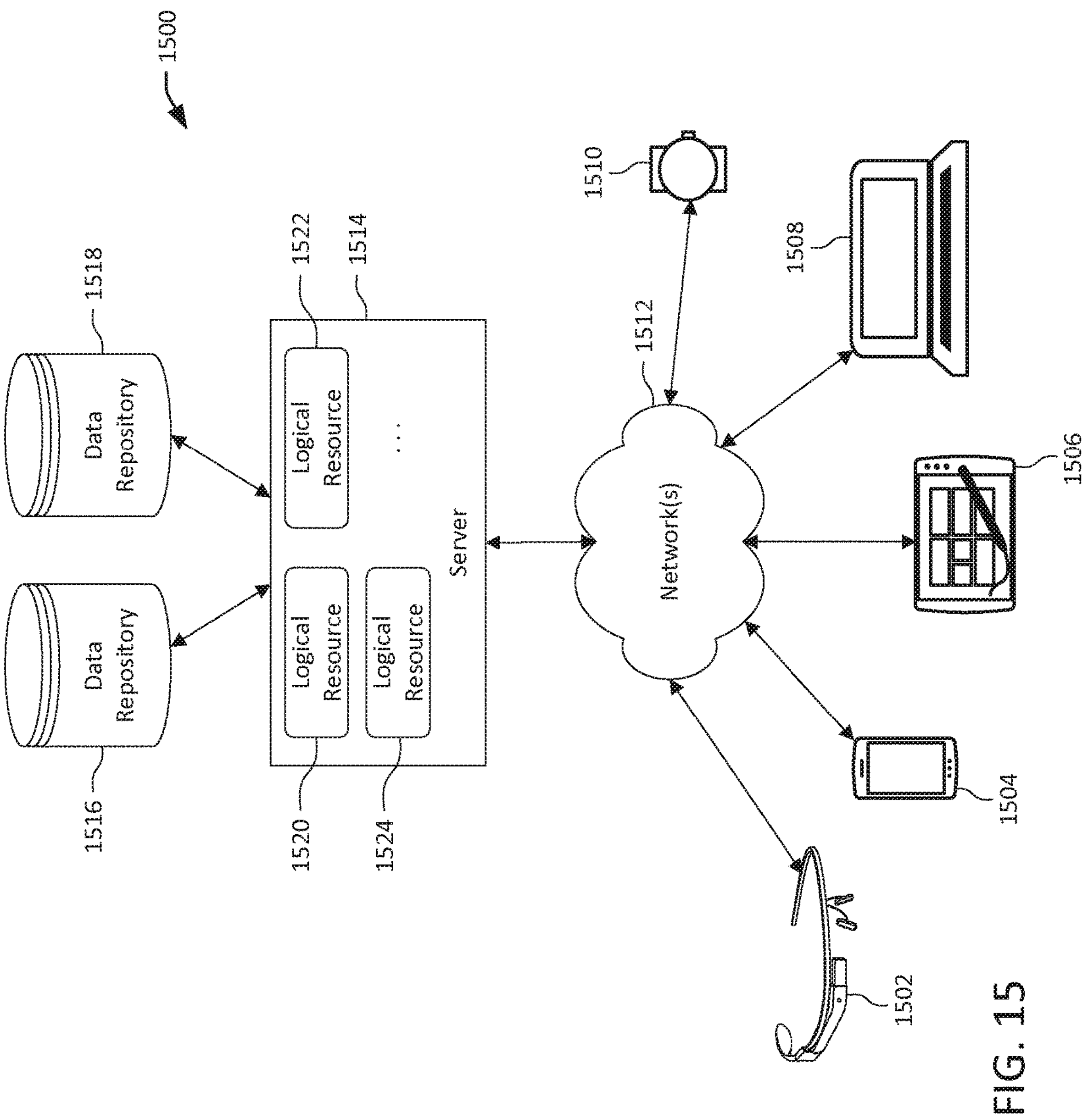
FIG. 15 depicts a simplified diagram of a distributed system for implementing certain aspects.

FIG. 15 depicts a simplified diagram of a distributed system 1500 for implementing an embodiment. In the illustrated embodiment, distributed system 1500 includes one or more client computing devices 1502, 1504, 1506, 1508, and/or 1510 coupled to a server 1514 via one or more communication networks 1512. Clients computing devices 1502, 1504, 1506, 1508, and/or 1510 may be configured to execute one or more applications.

In an example, server 1514 may be adapted to run one or more services or software applications that enable techniques for extraction of data (e.g., from a first tenancy of a cloud environment to a second tenancy of the cloud environment) in a mutually distrustful environment. In another example, server 1514 may be adapted to run one or more services or software applications that enable techniques for prevention of leakage of sensitive information through a side channel of a digital signature.

In certain aspects, server 1514 may also provide other services or software applications that can include non-virtual and virtual environments. In some aspects, these services may be offered as web-based or cloud services, such as under a Software as a Service (SaaS) model to the users of client computing devices 1502, 1504, 1506, 1508, and/or 1510. Users operating client computing devices 1502, 1504, 1506, 1508, and/or 1510 may in turn utilize one or more client applications to interact with server 1514 to utilize the services provided by these components.

In the configuration depicted in FIG. 15, server 1514 may include one or more components 1520, 1522 and 1524 that implement the functions performed by server 1514. These components may include software components that may be executed by one or more processors, hardware components, or combinations thereof. It should be appreciated that various different system configurations are possible, which may be different from distributed system 1500. The embodiment shown in FIG. 15 is thus one example of a distributed system for implementing an embodiment system and is not intended to be limiting.

Users may use client computing devices 1502, 1504, 1506, 1508, and/or 1510 for techniques for extraction of data (e.g., from a first tenancy of a cloud environment to a second tenancy of the cloud environment) in a mutually distrustful environment, and/or prevention of leakage of sensitive information through a side channel of a digital signature, in accordance with the teachings of this disclosure. A client device may provide an interface that enables a user of the client device to interact with the client device. The client device may also output information to the user via this interface. Although FIG. 15 depicts only five client computing devices, any number of client computing devices may be supported.

The client devices may include various types of computing systems such as smart phones or other portable handheld devices, general purpose computers such as personal computers and laptops, workstation computers, personal assistant devices, smart watches, smart glasses, or other wearable devices, equipment firmware, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux® or Linux-like operating systems such as Oracle® Linux and Google Chrome® OS) including various mobile operating systems (e.g., Microsoft Windows Mobile®, iOS®, Windows Phone®, Android™, HarmonyOS®, Tizen®, KaiOS®, Sailfish® OS, Ubuntu® Touch, CalyxOS®). Portable handheld devices may include cellular phones, smartphones, (e.g., an iPhone®), tablets (e.g., iPad®), and the like. Virtual personal assistants such as Amazon® Alexa®, Google® Assistant, Microsoft® Cortana®, Apple® Siri®, and others may be implemented on devices with a microphone and/or camera to receive user or environmental inputs, as well as a speaker and/or display to respond to the inputs. Wearable devices may include Apple® Watch, Samsung Galaxy® Watch, Meta Quest®, Ray-Ban® Meta® smart glasses, Snap® Spectacles, and other devices. Gaming systems may include various handheld gaming devices, Internet-enabled gaming devices (e.g., a Microsoft Xbox® gaming console with or without a Kinect® gesture input device, Sony PlayStation® system, Nintendo Switch™, and other devices), and the like. The client devices may be capable of executing various different applications such as various Internet-related apps, communication applications (e.g., e-mail applications, short message service (SMS) applications) and may use various communication protocols.

Network(s) 1512 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1512 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth™, and/or any other wireless protocol), and/or any combination of these and/or other networks.

Server 1514 may be composed of one or more general purpose computers, specialized server computers (including, by way of example, PC (personal computer) servers, UNIX® servers, LINIX® servers, mid-range servers, mainframe computers, rack-mounted servers, etc.), server farms, server clusters, a Real Application Cluster (RAC), database servers, or any other appropriate arrangement and/or combination. Server 1514 can include one or more virtual machines running virtual operating systems, or other computing architectures involving virtualization such as one or more flexible pools of logical storage devices that can be virtualized to maintain virtual storage devices for the server. In various aspects, server 1514 may be adapted to run one or more services or software applications that provide the functionality described in the foregoing disclosure.

The computing systems in server 1514 may run one or more operating systems including any of those discussed above, as well as any commercially available server operating system. Server 1514 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 1514 may include one or more applications to analyze and consolidate data feeds and/or event updates received from users of client computing devices 1502, 1504, 1506, 1508, and/or 1510. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1514 may also include one or more applications to display the data feeds and/or real-time events via one or more display devices of client computing devices 1502, 1504, 1506, 1508, and/or 1510.

Distributed system 1500 may also include one or more data repositories 1516, 1518. These data repositories may be used to store data and other information in certain aspects. For example, one or more of the data repositories 1516, 1518 may be used to store information for techniques for extraction of data (e.g., from a first tenancy of a cloud environment to a second tenancy of the cloud environment) in a mutually distrustful environment, and/or for prevention of leakage of sensitive information through a side channel of a digital signature. Data repositories 1516, 1518 may reside in a variety of locations. For example, a data repository used by server 1514 may be local to server 1514 or may be remote from server 1514 and in communication with server 1514 via a network-based or dedicated connection. Data repositories 1516, 1518 may be of different types. In certain aspects, a data repository used by server 1514 may be a database, for example, a relational database, a container database, an Exadata® storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 1516, 1518 may also be used by applications to store application data. The data repositories used by applications may be of different types such as, for example, a key-value store repository, an object store repository, or a general storage repository supported by a file system.

In one embodiment, server 1514 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 16:
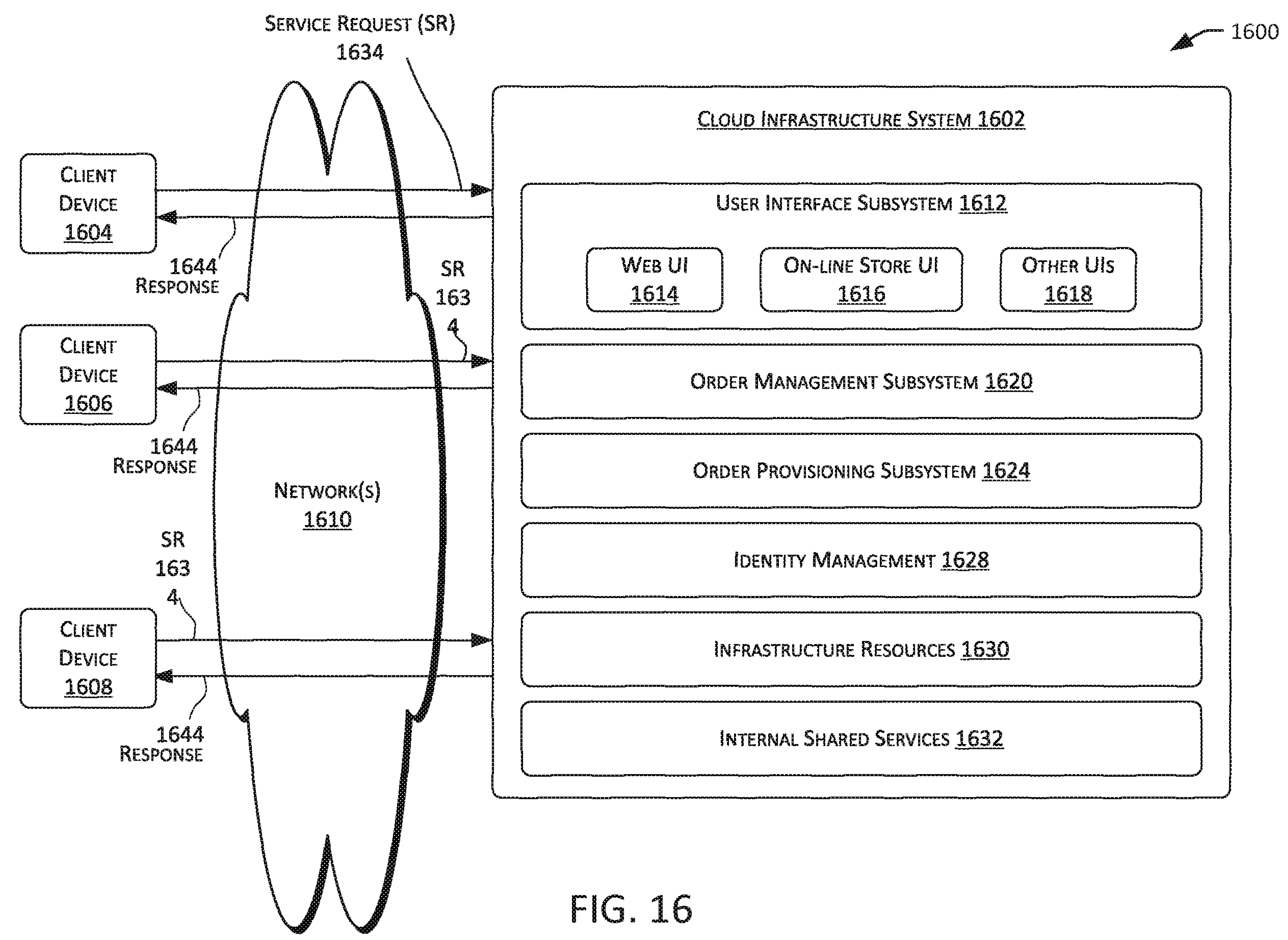
FIG. 16 is a simplified block diagram of one or more components of a system environment by which services provided by one or more components of an embodiment system may be offered as cloud services, in accordance with certain aspects.

FIG. 16 is a simplified block diagram of a cloud-based system environment that enables techniques for extraction of data (e.g., from a first tenancy of a cloud environment to a second tenancy of the cloud environment) in a mutually distrustful environment, and/or that enables techniques for prevention of leakage of sensitive information through a side channel of a digital signature, in accordance with certain aspects. In the embodiment depicted in FIG. 16, cloud infrastructure system 1602 may provide one or more cloud services that may be requested by users using one or more client computing devices 1604, 1606, and 1608. Cloud infrastructure system 1602 may comprise one or more computers and/or servers that may include those described above for server 1512. The computers in cloud infrastructure system 1602 may be organized as general purpose computers, specialized server computers, server farms, server clusters, or any other appropriate arrangement and/or combination.

Network(s) 1610 may facilitate communication and exchange of data between clients 1604, 1606, and 1608 and cloud infrastructure system 1602. Network(s) 1610 may include one or more networks. The networks may be of the same or different types. Network(s) 1610 may support one or more communication protocols, including wired and/or wireless protocols, for facilitating the communications.

The embodiment depicted in FIG. 16 is only one example of a cloud infrastructure system and is not intended to be limiting. It should be appreciated that, in some other aspects, cloud infrastructure system 1602 may have more or fewer components than those depicted in FIG. 16, may combine two or more components, or may have a different configuration or arrangement of components. For example, although FIG. 16 depicts three client computing devices, any number of client computing devices may be supported in alternative aspects.

The term cloud service is generally used to refer to a service that is made available to users on demand and via a communication network such as the Internet by systems (e.g., cloud infrastructure system 1602) of a service provider. Typically, in a public cloud environment, servers and systems that make up the cloud service provider's system are different from the cloud customer's ("tenant's") own on-premise servers and systems. The cloud service provider's systems are managed by the cloud service provider. Tenants can thus avail themselves of cloud services provided by a cloud service provider without having to purchase separate licenses, support, or hardware and software resources for the services. For example, a cloud service provider's system may host an application, and a user may, via a network 1610 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation®, such as database services, middleware services, application services, and others.

In certain aspects, cloud infrastructure system 1602 may provide one or more cloud services using different models such as under a Software as a Service (SaaS) model, a Platform as a Service (PaaS) model, an Infrastructure as a Service (IaaS) model, a Data as a Service (DaaS) model, and others, including hybrid service models. Cloud infrastructure system 1602 may include a suite of databases, middleware, applications, and/or other resources that enable provision of the various cloud services.

A SaaS model enables an application or software to be delivered to a tenant's client device over a communication network like the Internet, as a service, without the tenant having to buy the hardware or software for the underlying application. For example, a SaaS model may be used to provide tenants access to on-demand applications that are hosted by cloud infrastructure system 1602. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a tenant as a cloud service to provide elastic compute and storage capabilities. Various IaaS services are provided by Oracle Corporation®.

A PaaS model is generally used to provide, as a service, platform and environment resources that enable tenants to develop, run, and manage applications and services without the tenant having to procure, build, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

A DaaS model is generally used to provide data as a service. Datasets may searched, combined, summarized, and downloaded or placed into use between applications. For example, user profile data may be updated by one application and provided to another application. As another example, summaries of user profile information generated based on a dataset may be used to enrich another dataset.

Cloud services are generally provided on an on-demand self-service basis, subscription-based, elastically scalable, reliable, highly available, and secure manner. For example, a tenant, via a subscription order, may order one or more services provided by cloud infrastructure system 1602. Cloud infrastructure system 1602 then performs processing to provide the services requested in the tenant's subscription order. Cloud infrastructure system 1602 may be configured to provide one or even multiple cloud services.

Cloud infrastructure system 1602 may provide the cloud services via different deployment models. In a public cloud model, cloud infrastructure system 1602 may be owned by a third party cloud services provider and the cloud services are offered to any general public tenant, where the tenant can be an individual or an enterprise. In certain other aspects, under a private cloud model, cloud infrastructure system 1602 may be operated within an organization (e.g., within an enterprise organization) and services provided to clients that are within the organization. For example, the clients may be various departments or employees or other individuals of departments of an enterprise such as the Human Resources department, the Payroll department, etc., or other individuals of the enterprise. In certain other aspects, under a community cloud model, the cloud infrastructure system 1602 and the services provided may be shared by several organizations in a related community. Various other models such as hybrids of the above mentioned models may also be used.

Client computing devices 1604, 1606, and 1608 may be of different types (such as devices 1502, 1504, 1506, and 1508 depicted in FIG. 15) and may be capable of operating one or more client applications. A user may use a client device to interact with cloud infrastructure system 1602, such as to request a service provided by cloud infrastructure system 1602.

In some aspects, the processing performed by cloud infrastructure system 1602 for providing chatbot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 1602 for determining the intent of an utterance. The data used for this analysis may include structured data (e.g., data stored in a database or structured according to a structured model) and/or unstructured data (e.g., data blobs (binary large objects)).

As depicted in the embodiment in FIG. 16, cloud infrastructure system 1602 may include infrastructure resources 1630 that are utilized for facilitating the provision of various cloud services offered by cloud infrastructure system 1602. Infrastructure resources 1630 may include, for example, processing resources, storage or memory resources, networking resources, and the like.

In certain aspects, to facilitate efficient provisioning of these resources for supporting the various cloud services provided by cloud infrastructure system 1602 for different tenants, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1602 may itself internally use services 1632 that are shared by different components of cloud infrastructure system 1602 and which facilitate the provisioning of services by cloud infrastructure system 1602. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 1602 may comprise multiple subsystems. These subsystems may be implemented in software, or hardware, or combinations thereof. As depicted in FIG. 16, the subsystems may include a user interface subsystem 1612 that enables users of cloud infrastructure system 1602 to interact with cloud infrastructure system 1602. User interface subsystem 1612 may include various different interfaces such as a web interface 1614, an online store interface 1616 where cloud services provided by cloud infrastructure system 1602 are advertised and are purchasable by a consumer, and other interfaces 1618. For example, a tenant may, using a client device, request (service request 1634) one or more services provided by cloud infrastructure system 1602 using one or more of interfaces 1614, 1616, and 1618. For example, a tenant may access the online store, browse cloud services offered by cloud infrastructure system 1602, and place a subscription order for one or more services offered by cloud infrastructure system 1602 that the tenant wishes to subscribe to. The service request may include information identifying the tenant and one or more services that the tenant desires to subscribe to.

In certain aspects, such as the embodiment depicted in FIG. 16, cloud infrastructure system 1602 may comprise an order management subsystem (OMS) 1620 that is configured to process the new order. As part of this processing, OMS 1620 may be configured to: create an account for the tenant, if not done already; receive billing and/or accounting information from the tenant that is to be used for billing the tenant for providing the requested service to the tenant; verify the tenant information; upon verification, book the order for the tenant; and orchestrate various workflows to prepare the order for provisioning.

Once properly validated, OMS 1620 may then invoke the order provisioning subsystem (OPS) 1624 that is configured to provision resources for the order including processing, memory, and networking resources. The provisioning may include allocating resources for the order and configuring the resources to facilitate the service requested by the tenant order. The manner in which resources are provisioned for an order and the type of the provisioned resources may depend upon the type of cloud service that has been ordered by the tenant. For example, according to one workflow, OPS 1624 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting tenant for providing the requested service.

Cloud infrastructure system 1602 may send a response or notification 1644 to the requesting tenant to indicate when the requested service is now ready for use. In some instances, information (e.g., a link) may be sent to the tenant that enables the tenant to start using and availing the benefits of the requested services.

Cloud infrastructure system 1602 may provide services to multiple tenants. For each tenant, cloud infrastructure system 1602 is responsible for managing information related to one or more subscription orders received from the tenant, maintaining tenant data related to the orders, and providing the requested services to the tenant or clients of the tenant. Cloud infrastructure system 1602 may also collect usage statistics regarding a tenant's use of subscribed services. For example, statistics may be collected for the amount of storage used, the amount of data transferred, the number of users, and the amount of system up time and system down time, and the like. This usage information may be used to bill the tenant. Billing may be done, for example, on a monthly cycle.

Cloud infrastructure system 1602 may provide services to multiple tenants in parallel. Cloud infrastructure system 1602 may store information for these tenants, including possibly proprietary information. In certain aspects, cloud infrastructure system 1602 comprises an identity management subsystem (IMS) 1628 that is configured to manage tenant's information and provide the separation of the managed information such that information related to one tenant is not accessible by another tenant. IMS 1628 may be configured to provide various security-related services such as identity services, such as information access management, authentication and authorization services, services for managing tenant identities and roles and related capabilities, and the like.

Figure 17:
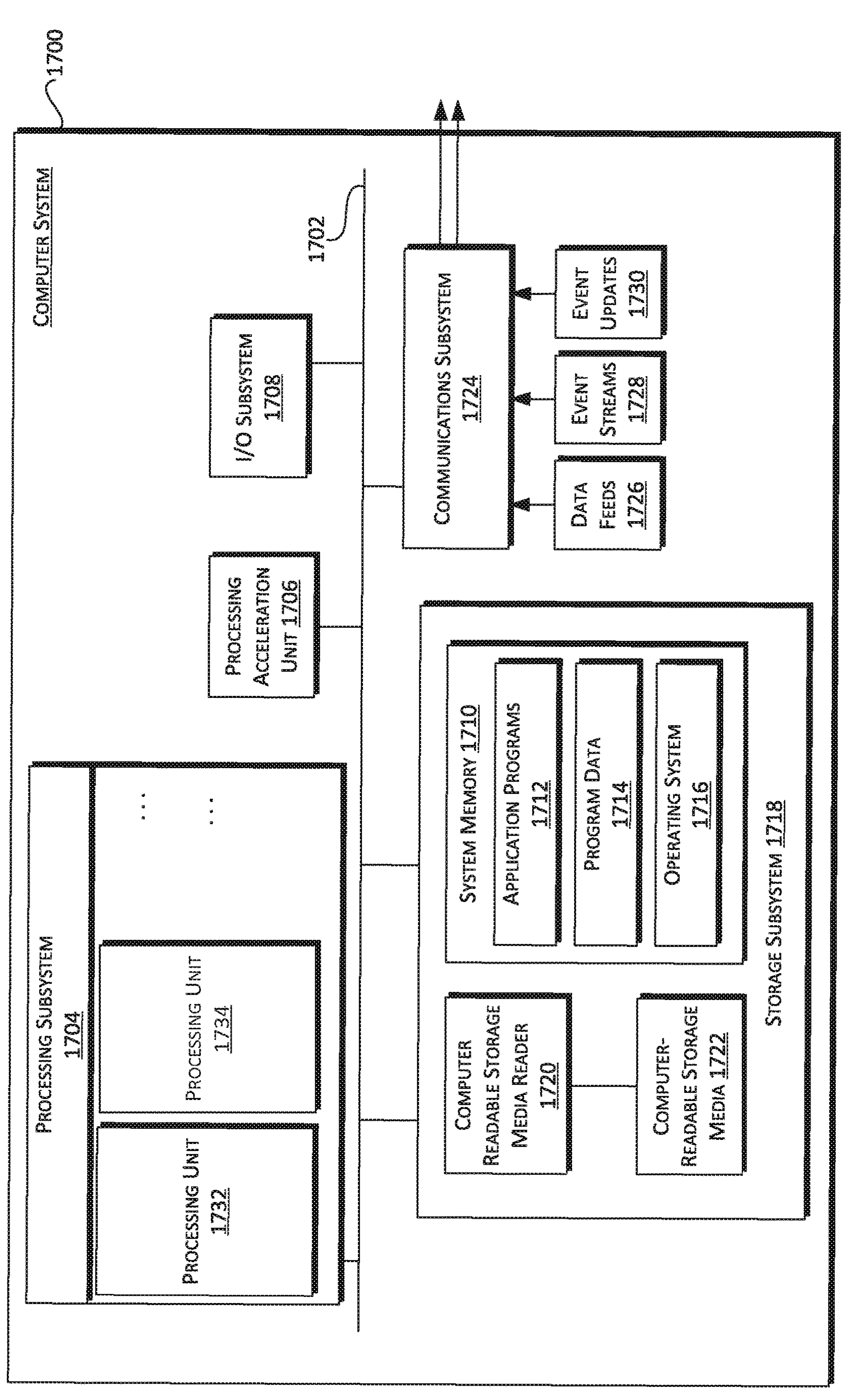
FIG. 17 illustrates an example computer system that may be used to implement certain aspects.

FIG. 17 illustrates an exemplary computer system 1700 that may be used to implement certain aspects. As shown in FIG. 17, computer system 1700 includes various subsystems including a processing subsystem 1704 that communicates with a number of other subsystems via a bus subsystem 1702. These other subsystems may include a processing acceleration unit 1706, an I/O subsystem 1708, a storage subsystem 1718, and a communications subsystem 1724. Storage subsystem 1718 may include non-transitory computer-readable storage media including storage media 1722 and a system memory 1710.

Bus subsystem 1702 provides a mechanism for letting the various components and subsystems of computer system 1700 communicate with each other as intended. Although bus subsystem 1702 is shown schematically as a single bus, alternative aspects of the bus subsystem may utilize multiple buses. Bus subsystem 1702 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1704 controls the operation of computer system 1700 and may comprise one or more processors, application specific integrated circuits (ASICs), or field programmable gate arrays (FPGAs). The processors may include be single core or multicore processors. The processing resources of computer system 1700 can be organized into one or more processing units 1732, 1734, etc. A processing unit may include one or more processors, one or more cores from the same or different processors, a combination of cores and processors, or other combinations of cores and processors. In some aspects, processing subsystem 1704 can include one or more special purpose co-processors such as graphics processors, digital signal processors (DSPs), or the like. In some aspects, some or all of the processing units of processing subsystem 1704 can be implemented using customized circuits, such as application specific integrated circuits (ASICs), or field programmable gate arrays (FPGAs).

In some aspects, the processing units in processing subsystem 1704 can execute instructions stored in system memory 1710 or on computer readable storage media 1722. In various aspects, the processing units can execute a variety of programs or code instructions and can maintain multiple concurrently executing programs or processes. At any given time, some or all of the program code to be executed can be resident in system memory 1710 and/or on computer-readable storage media 1722 including potentially on one or more storage devices. Through suitable programming, processing subsystem 1704 can provide various functionalities described above. In instances where computer system 1700 is executing one or more virtual machines, one or more processing units may be allocated to each virtual machine.

In certain aspects, a processing acceleration unit 1706 may optionally be provided for performing customized processing or for off-loading some of the processing performed by processing subsystem 1704 so as to accelerate the overall processing performed by computer system 1700.

I/O subsystem 1708 may include devices and mechanisms for inputting information to computer system 1700 and/or for outputting information from or via computer system 1700. In general, use of the term input device is intended to include all possible types of devices and mechanisms for inputting information to computer system 1700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Meta Quest® controller, Microsoft Kinect® motion sensor, the Microsoft Xbox® 360 game controller, or devices that provide an interface for receiving input using gestures and spoken commands. User interface input devices may also include eye gesture recognition devices such as a blink detector that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems (e.g., Siri® navigator or Amazon Alexa®) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 1700 to a user or other computer. User interface output devices may include a display subsystem, indicator lights, or non-visual displays such as audio output devices, etc. The display subsystem may be any device for outputting a digital picture. Example display devices include flat panel display devices such as those using a light emitting diode (LED) display, a liquid crystal display (LCD) or plasma display, a projection device, a touch screen, a desktop or laptop computer monitor, and the like. As another example, wearable display devices such as Meta Quest® or Microsoft HoloLens® may be mounted to the user for displaying information. User interface output devices may include, without limitation, a variety of display devices that visually convey text, graphics, and audio/video information such as monitors, printers, speakers, headphones, automotive navigation systems, plotters, voice output devices, and modems.

Storage subsystem 1718 provides a repository or data store for storing information and data that is used by computer system 1700. Storage subsystem 1718 provides a tangible non-transitory computer-readable storage medium for storing the basic programming and data constructs that provide the functionality of some aspects. Storage subsystem 1718 may store software (e.g., programs, code modules, instructions) that when executed by processing subsystem 1704 provides the functionality described above. The software may be executed by one or more processing units of processing subsystem 1704. Storage subsystem 1718 may also provide a repository for storing data used in accordance with the teachings of this disclosure.

Storage subsystem 1718 may include one or more non-transitory memory devices, including volatile and non-volatile memory devices. As shown in FIG. 17, storage subsystem 1718 includes a system memory 1710 and a computer-readable storage media 1722. System memory 1710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1700, such as during start-up, may typically be stored in the ROM. The RAM typically contains data and/or program modules that are presently being operated and executed by processing subsystem 1704. In some implementations, system memory 1710 may include multiple different types of memory, such as static random access memory (SRAM), dynamic random access memory (DRAM), and the like.

By way of example, and not limitation, as depicted in FIG. 17, system memory 1710 may load application programs 1712 that are being executed, which may include various applications such as Web browsers, mid-tier applications, relational database management systems (RDBMS), etc., program data 1714, and an operating system 1716. By way of example, operating system 1716 may include various versions of Microsoft Windows®, Apple Macintosh®, and/or Linux® operating systems, a variety of commercially-available UNIX® or UNIX-like operating systems (including without limitation the variety of GNU/Linux operating systems, the Oracle Linux®, Google Chrome® OS, and the like) and/or mobile operating systems such as iOS, Windows® Phone, Android® OS, and others.

Computer-readable storage media 1722 may store programming and data constructs that provide the functionality of some aspects. Computer-readable media 1722 may provide storage of computer-readable instructions, data structures, program modules, and other data for computer system 1700. Software (programs, code modules, instructions) that, when executed by processing subsystem 1704 provides the functionality described above, may be stored in storage subsystem 1718. By way of example, computer-readable storage media 1722 may include non-volatile memory such as a hard disk drive, a magnetic disk drive, an optical disk drive such as a CD ROM, digital video disc (DVD), a Blu-Ray® disk, or other optical media. Computer-readable storage media 1722 may include, but is not limited to, Zip® drives, flash memory cards, universal serial bus (USB) flash drives, secure digital (SD) cards, DVD disks, digital video tape, and the like. Computer-readable storage media 1722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 1718 may also include a computer-readable storage media reader 1720 that can further be connected to computer-readable storage media 1722. Reader 1720 may receive and be configured to read data from a memory device such as a disk, a flash drive, etc.

In certain aspects, computer system 1700 may support virtualization technologies, including but not limited to virtualization of processing and memory resources. For example, computer system 1700 may provide support for executing one or more virtual machines. In certain aspects, computer system 1700 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1700. Accordingly, multiple operating systems may potentially be run concurrently by computer system 1700.

Communications subsystem 1724 provides an interface to other computer systems and networks. Communications subsystem 1724 serves as an interface for receiving data from and transmitting data to other systems from computer system 1700. For example, communications subsystem 1724 may enable computer system 1700 to establish a communication channel to one or more client devices via the Internet for receiving and sending information from and to the client devices.

Communication subsystem 1724 may support both wired and/or wireless communication protocols. For example, in certain aspects, communications subsystem 1724 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 1724 can provide wired network connectivity (e.g., Ethernet) in addition to or instead of a wireless interface.

Communication subsystem 1724 can receive and transmit data in various forms. For example, in some aspects, in addition to other forms, communications subsystem 1724 may receive input communications in the form of structured and/or unstructured data feeds 1726, event streams 1728, event updates 1730, and the like. For example, communications subsystem 1724 may be configured to receive (or send) data feeds 1726 in real-time from users of social media networks and/or other communication services such as Twitter feeds, Facebook updates, web feeds such as Rich Site Summary (RSS) feeds, and/or real-time updates from one or more third party information sources.

In certain aspects, communications subsystem 1724 may be configured to receive data in the form of continuous data streams, which may include event streams 1728 of real-time events and/or event updates 1730, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1724 may also be configured to communicate data from computer system 1700 to other computer systems or networks. The data may be communicated in various different forms such as structured and/or unstructured data feeds 1726, event streams 1728, event updates 1730, and the like to one or more databases that may be in communication with one or more streaming data source computers coupled to computer system 1700.

Computer system 1700 can be one of various types, including a handheld portable device (e.g., an iPhone® cellular phone, an iPad® computing tablet, a personal digital assistant (PDA)), a wearable device (e.g., a Meta Quest® head mounted display), a personal computer, a workstation, a mainframe, a kiosk, a server rack, or any other data processing system. Due to the ever-changing nature of computers and networks, the description of computer system 1700 depicted in FIG. 17 is intended only as a specific example. Many other configurations having more or fewer components than the system depicted in FIG. 17 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A method comprising:
- receiving, by a transmission service, data;
- transmitting, from the transmission service, the data to a signature and encryption (SE) service, along with an encryption key;
- receiving, by the transmission service from the SE service, (i) signed and encrypted data that is encrypted using the encryption key and signed by the SE service, and (ii) metadata including a value that is calculated based on an amount of source code included within the data; and
- transmitting, by the transmission service, the signed and encrypted data and the metadata to an intermediate zone, to facilitate the intermediate zone to verify a signature of the signed and encrypted data, and allow passage of the signed and encrypted data to a reception service.

2. The method of claim 1, wherein:

the transmission service is within a first tenancy of a cloud environment; and the reception service is within a second tenancy of the cloud environment that is different from the first tenancy.

3. The method of claim 2, wherein the intermediate zone is within one of (i) the first tenancy of the cloud environment, or (ii) a third tenancy of the cloud environment that is different from each of the first and second tenancies.

4. The method of claim 1, further comprising:

subsequent to receiving the data, generating a cleartext form of the data, wherein transmitting the data to the SE service comprises transmitting the cleartext form of the data to the SE service.

5. The method of claim 1, further comprising:

responsive at least in part to the intermediate zone verifying the signature of the signed and encrypted data, receiving, from the intermediate zone, the signed and encrypted data at the reception service.

6. The method of claim 1, further comprising:

providing one or more keys to the reception service for decryption of the signed and encrypted data; and refraining from providing the one or more keys to the intermediate zone for decryption of the signed and encrypted data, wherein the transmission service does not have access to a signature key used by the SE service to sign the encrypted data.

7. The method of claim 1, wherein the value within the metadata indicates whether the amount of the source code included within the data is less than, or greater than a threshold value.

8. The method of claim 1, wherein:

the encryption key is a first encryption key;

the value within the metadata is encrypted using a second encryption key that is different from the first encryption key; and the intermediate zone decrypts at least the section of the metadata, without decrypting the signed and encrypted data.

9. The method of claim 8, wherein the value within the metadata that is encrypted is less than one byte.

10. The method of claim 1, wherein:

the source code is of a program that is deployable to a plurality of mobile devices or to a cloud-based server; and the value within the metadata quantifies the amount of the source code included within the data.

11. The method of claim 1, wherein the intermediate zone allows passage of the signed and encrypted data to the reception service, responsive at least in part to the amount of the source code included within the data, as indicated by the value within the metadata, being less than a threshold value.

12. The method of claim 1, wherein the SE service maintains a log of the data, and the log of the data includes the source code included within the data.

13. The method of claim 1, further comprising:

analyzing the source code of a program that is deployable to a plurality of mobile devices;

generating the data that at least in part includes results of analyzing the source code; and transmitting the data to the transmission service.

14. The method of claim 1, wherein the data is first data, wherein the encryption key is a first encryption key, wherein the signed and encrypted data is first signed and encrypted data, and wherein the method further comprises:

transmitting, by the transmission service, second data to the SE service, along with a second encryption key;

receiving, from the SE service, second signed and encrypted data that is (i) encrypted using the second encryption key and (ii) signed by the SE service;

detecting an error condition associated with the second signed and encrypted data;

transmitting, by the transmission service, a request to the intermediate zone;

receiving, by the transmission service, a debug token from the intermediate zone, responsive at least in part to transmitting the request to the intermediate zone;

transmitting, by the transmission service, the debug token to the SE service; and receiving debug information from the SE service, responsive at least in part to transmitting the debug token to the SE service, the debug information including information associated with debugging the error condition.

15. The method of claim 14, further comprising:

transmitting, by the transmission service, the debug information to the intermediate zone for debugging.

16. The method of claim 14, further comprising:

transmitting, by the transmission service, the data and the second encryption key to the SE service, along with transmitting the token to the SE service;

receiving, from the SE service, third signed and encrypted data, along with receiving the debug information from the SE service; and transmitting, by the transmission service, the debug information and the third signed and encrypted data to the intermediate zone for debugging.

17. The method of claim 14, further comprising:

transmitting, by the transmission service, the second signed and encrypted data to the intermediate zone, along with transmitting the request to the intermediate zone.

18. A non-transitory computer-readable medium including instructions that when executed by one or more processors, cause the one or more processors to perform operations including:

transmitting, by a transmission service, data to a signature and encryption (SE) service, along with an encryption key;

receiving, from the SE service, signed and encrypted data that is (i) encrypted using the encryption key and (ii) signed by the SE service;

detecting an error condition associated with the signed and encrypted data;

transmitting, by the transmission service, a request to an intermediate zone;

receiving, by the transmission service, a debug token from the intermediate zone, responsive at least in part to transmitting the request to the intermediate zone;

transmitting, by the transmission service, the debug token to the SE service;

receiving debug information from the SE service, responsive at least in part to transmitting the debug token to the SE service, the debug information including information associated with debugging the error condition; and transmitting, by the transmission service, the debug information to the intermediate zone, for debugging the error condition.

19. The non-transitory computer-readable medium of claim 18, wherein:

the transmission service is within a first tenancy of a cloud environment; and the intermediate zone is within a second tenancy of the cloud environment that is different from the first tenancy.

20. The non-transitory computer-readable medium of claim 18, wherein the signed and encrypted data is first signed and encrypted data, and wherein the operations further include:

transmitting, by the transmission service, the data and the encryption key to the SE service, along with transmitting the token to the SE service;

receiving, from the SE service, second signed and encrypted data, along with receiving the debug information from the SE service; and transmitting, by the transmission service, the second signed and encrypted data to the intermediate zone, along with transmitting the debug information to the intermediate zone.

21. The non-transitory computer-readable medium of claim 18, wherein the operations further include:

transmitting, by the transmission service, the data to the intermediate zone, along with transmitting the second signed and encrypted data and the debug information to the intermediate zone.

22. A system comprising:

one or more processors; and one or more non-transitory computer-readable media storing instructions, which, when executed by the system, cause the system to perform a set of actions including:

receiving, by a transmission service, data;

transmitting, from the transmission service, the data to a signature and encryption (SE) service, along with an encryption key;

receiving, by the transmission service from the SE service, signed and encrypted data that is (i) encrypted using the encryption key and (ii) signed by the SE service, wherein the SE service maintains a log of the data; and transmitting, by the transmission service, the signed and encrypted data to an intermediate zone, to facilitate the intermediate zone to verify a signature of the signed and encrypted data, and allow passage of the signed and encrypted data to a reception service.

23. The system of claim 22, wherein:

the transmission service is within a first tenancy of a cloud environment;

the reception service is within a second tenancy of the cloud environment that is different from the first tenancy; and the intermediate zone is within one of (i) the first tenancy of the cloud environment, or (ii) a third tenancy of the cloud environment that is different from each of the first and second tenancies.

* * * * *